(12) United States Patent
Komatsu

(10) Patent No.: US 10,369,883 B2
(45) Date of Patent: Aug. 6, 2019

(54) WORK VEHICLE

(71) Applicant: Yanmar Co., Ltd., Osaka-shi, Osaka-fu (JP)

(72) Inventor: Masakazu Komatsu, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/750,812

(22) PCT Filed: Jul. 29, 2016

(86) PCT No.: PCT/JP2016/003520
§ 371 (c)(1),
(2) Date: Feb. 6, 2018

(87) PCT Pub. No.: WO2017/026103
PCT Pub. Date: Feb. 16, 2017

(65) Prior Publication Data
US 2018/0229601 A1    Aug. 16, 2018

(30) Foreign Application Priority Data

Aug. 7, 2015   (JP) .................................. 2015-157240

(51) Int. Cl.
*B60K 35/00*  (2006.01)
*B60K 15/063*  (2006.01)
(Continued)

(52) U.S. Cl.
CPC .......... *B60K 15/063* (2013.01); *B60K 15/073* (2013.01); *B60K 35/00* (2013.01);
(Continued)

(58) Field of Classification Search
CPC .... B62D 25/10; B62D 25/14; B62D 49/0671; B62D 65/02; B62D 25/145;
(Continued)

(56) References Cited

U.S. PATENT DOCUMENTS 8,100,212 B2    1/2012   Sawai et al.
2006/0289222 A1*  12/2006  Tokuhara ............... B62D 25/10
                                                    180/305
2009/0260909 A1*  10/2009  Oka .................... B62D 49/0671
                                                    180/291

FOREIGN PATENT DOCUMENTS

JP    1983-118081 U    8/1983
JP    1984-57280 U    4/1984
(Continued)

OTHER PUBLICATIONS

International Search Report dated Oct. 11, 2016 issued in corresponding PCT Application PCT/JP2016/003520.
(Continued)

*Primary Examiner* — Bryan A Evans
(74) *Attorney, Agent, or Firm* — Norton Rose Fulbright US LLP

(57) ABSTRACT

A work vehicle such as a tractor including a fuel tank (19), a fuel tank cover (30), a dashboard support member (40), and a dashboard (50). The fuel tank (19) is disposed in a rear portion of a hood in a longitudinal direction of a vehicle body of the tractor. The fuel tank cover (30) covers a rear portion of the fuel tank (19). The dashboard support member (40) is attached to the fuel tank cover (30). The dashboard (50) is supported by the dashboard support member (40). The fuel tank cover (30) includes a first attachment portion (31) for attaching the dashboard support member (40). The dashboard (50) is configured to be directly attachable to the first attachment portion (31) (without using the dashboard support member (40)).

20 Claims, 18 Drawing Sheets

(51) Int. Cl.
*B60K 37/00* (2006.01)
*B62D 49/00* (2006.01)
*B62D 25/14* (2006.01)
*B60K 15/073* (2006.01)
*B62D 33/06* (2006.01)

(52) U.S. Cl.
CPC ............... *B60K 37/00* (2013.01); *B62D 25/14* (2013.01); *B62D 33/0617* (2013.01); *B62D 49/00* (2013.01); *B60K 2015/0637* (2013.01); *B60K 2350/943* (2013.01); *B62D 25/145* (2013.01)

(58) Field of Classification Search
CPC ................ B62D 33/0617; B62D 49/00; B60K 2015/0637; B60K 15/063; B60K 15/067; B60K 35/00; B60K 37/00; B60K 2350/943
See application file for complete search history.

(56) References Cited

FOREIGN PATENT DOCUMENTS

| | | |
|---|---|---|
| JP | H11-513340 A | 11/1999 |
| JP | 2004-231014 A | 8/2004 |
| JP | 2005-029126 A | 2/2005 |
| JP | 2007-076559 A | 3/2007 |
| JP | 2008-074387 A | 4/2008 |
| JP | 2014-156830 A | 8/2014 |

OTHER PUBLICATIONS

European Search Report dated Feb. 18, 2019 issued in corresponding EP Application 16834805.0 cites the patent document above.

* cited by examiner

ANOTHER SPECIFICATION

WORK VEHICLE

CROSS REFERENCES TO RELATED APPLICATIONS

This application is a national stage application pursuant to 35 U.S.C. § 371 of International Application No. PCT/JP2016/003520, filed on Jul. 29, 2016, which claims priority under 35 U.S.C. § 119 to Japanese Patent Application No. 2015-157240, filed on Aug. 7, 2015, the disclosures of which are hereby incorporated by reference in their entireties.

TECHNICAL FIELD

The present invention relates to a work vehicle including a dashboard.

BACKGROUND ART

In a configuration known to date, a dashboard is disposed near a driver seat of a work vehicle and ahead of a steering wheel. In a typical configuration, an operation panel is disposed on the dashboard and includes a combination meter. Patent Literature (PTL 1) discloses an automobile including a position-adjustable dashboard, although PTL1 relates not to a work vehicle but to a bus.

In the automobile of PTL 1, a steering column and the dashboard do not move relative to each other, but rather constitute one assembly that can be raised and lowered and can pivot. Movement of this assembly can be adjusted with an appropriate slideway guide, and can be locked at any position.

In PTL 1, a stabilizing device is associated with the dashboard. The sideway guide included in the stabilizing device is disposed on guide rails that are significantly spaced from each other. The sideway guide is combined with a toothed wheel/rack connection.

CITATION LIST

Patent Literature

PTL 1: Japanese Patent Application Publication (Translation of PCT Application) No. H11-513340 (1999)

SUMMARY OF INVENTION

Technical Problem

In PTL 1 described above, the steering column and the dashboard do not move relative to each other, but is formed as one assembly. Thus, the configuration of PTL 1 is not necessarily preferable in the case of manufacturing work vehicles conforming to a plurality of specifications with different positions of dashboards. In PTL 1, to adjust the assembly constituted by the steering column and the dashboard, a device such as a sideway guide is needed, and thus, the structure for the adjustment is complicated, which is disadvantageous in terms of costs.

Some aspects of the present invention have been made in view of the foregoing circumstances, and have an object of providing a work vehicle that can easily achieve different specifications with different positions of a dashboard by using a simple configuration.

Solution to Problem and Advantages

Problems to be solved by some aspects of the present invention have been described above, and solutions for the problems and advantages of the solutions will be described below.

In an aspect of the present invention, a work vehicle having the following configuration is provided. Specifically, the work vehicle includes a fuel tank, a fuel tank cover, a support member, and a dashboard. The fuel tank is disposed in a rear portion of a hood in a longitudinal direction of a vehicle body. The fuel tank cover covers a rear portion of the fuel tank. The support member is attached to the fuel tank cover. The dashboard is supported by the support member. The fuel tank cover includes an attachment portion for attaching the support member. The dashboard is configured to be directly attachable to the attachment portion.

In this manner, a configuration in which the dashboard can be disposed at different positions depending on whether the support member is interposed or not can be obtained. Consequently, the dashboard and the fuel tank cover, for example, can also be used for a work vehicle conforming to another specification with a different position of the dashboard. Thus, no design change, for example, is necessary for the dashboard and the fuel tank cover, and expense in effort and costs, for example, can be reduced. In addition, the dashboard can be attached to different positions with a simple configuration of simply switching the attachment of the support member between present and absent.

The work vehicle preferably has the following configuration. Specifically, the dashboard includes a fixing portion configured to be directly attachable to the attachment portion for the support member in the fuel tank cover. The support member supports the dashboard with the fixing portion of the dashboard interposed therebetween.

In this manner, the fixing portion of the dashboard attached to the support member can be used as a fixing means in the case of directly attaching the dashboard to the fuel tank cover without the support member. Accordingly, attachment of the dashboard to different positions can be easily performed with a compact configuration.

The work vehicle preferably has the following configuration. Specifically, the support member is constituted by a plate member, one support member being attached to each lateral side of an upper portion of the fuel tank cover. The dashboard is configured to be attachable to a plurality of positions in a vertical direction depending on whether the support member is interposed or not.

In this manner, the support members can be easily formed, and the dashboard can be stably supported at a high position.

The work vehicle preferably includes a cover member connected to a lower end of the dashboard and covering space below a gap between the dashboard and the fuel tank cover.

In this manner, components, for example, can be suitably covered with the cover member below the dashboard attached at a relatively high position by using the dashboard support member. In addition, since the cover member is a member different from the dashboard, in another specification in which the dashboard is attached at a low position, the cover member can be omitted so that a compact configuration can be achieved.

The work vehicle preferably has the following configuration. Specifically, the dashboard includes an operation panel portion and an outer peripheral board portion. The outer peripheral board portion is fixed to the operation panel portion. The fuel tank cover includes an operation panel portion attachment portion for attaching the operation panel portion in addition to the attachment portion. The operation panel portion is attached to the operation panel portion attachment portion of the fuel tank cover with an attachment member interposed therebetween.

In this manner, the operation panel portion can be easily attached to the fuel tank cover at different positions only by appropriately adjusting the attachment member without changing any of the configuration of the operation panel portion and the fuel tank cover.

In the work vehicle, the attachment member is preferably formed into a plate shape, and has a plurality of attachment holes configured to be attachable to the operation panel portion attachment portion.

In this manner, the attachment member can be easily formed, and the operation panel portion of the dashboard can be attached at different positions with a simple configuration.

In the work vehicle, the attachment member preferably includes a member in which a distance between a plurality of attachment holes is ½ of an amount of change of attachment position of the dashboard depending on whether the support member is present or not.

In this manner, switching of the attachment position of the dashboard can be achieved with a compact configuration of the attachment member.

In the work vehicle, the attachment member preferably includes a member that supports an engine starter switch for starting an engine included in the vehicle body.

In this manner, the configuration can be simplified.

DESCRIPTION OF EMBODIMENTS

Figure 1:
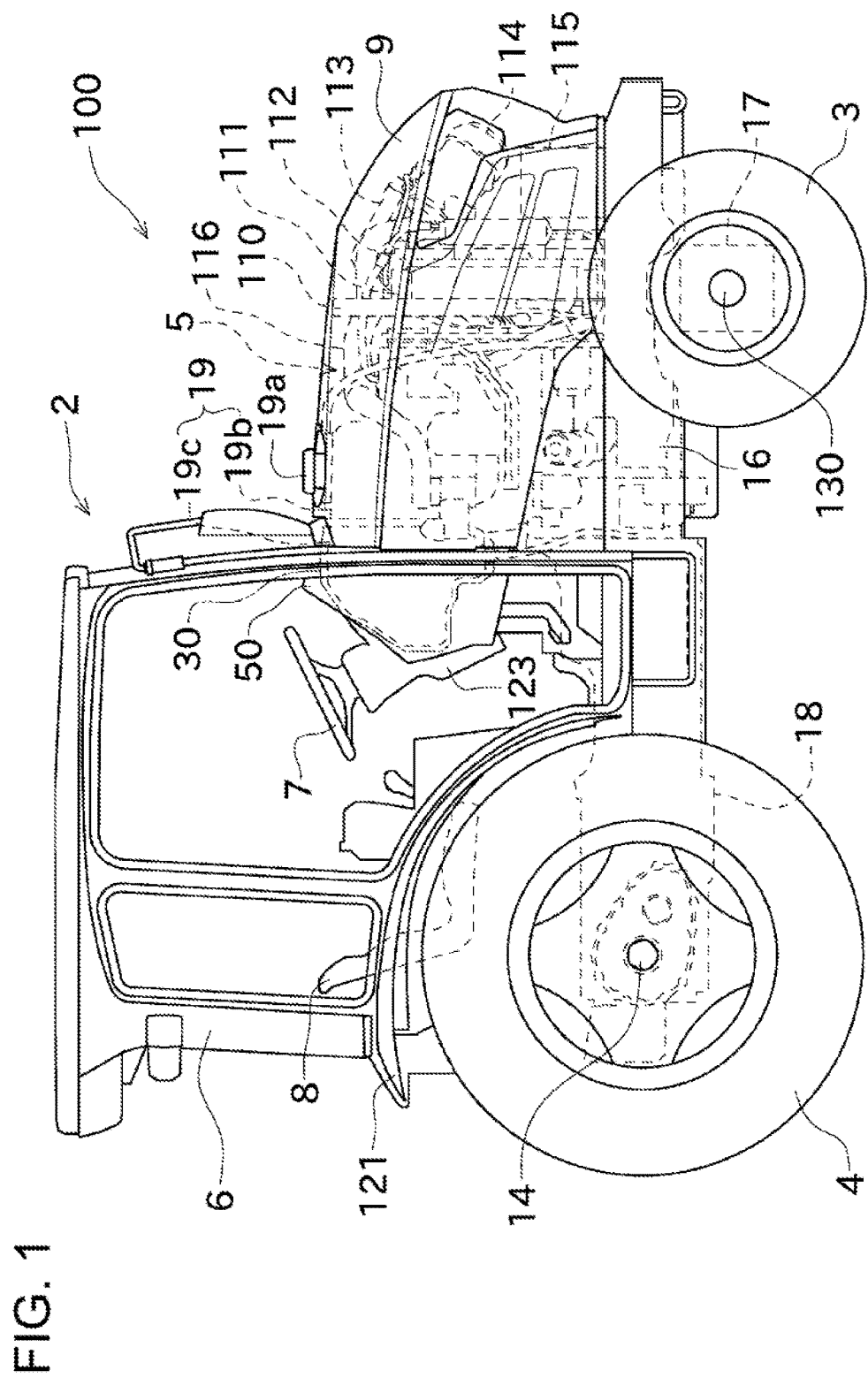
FIG. 1 A left side view illustrating an overall configuration of a tractor according to an embodiment of the present invention.

With reference to the drawings, an embodiment of the present invention will now be described. First, a configuration of a tractor 100 according to an embodiment of the present invention will be briefly described. FIG. 1 is a left side view illustrating an overall configuration of the tractor 100. In the following description, terms such as "left" and "right" refer to the left and the right, for example, in the direction in which the tractor 100 moves forward.

The tractor 100 serving as a work vehicle for farm work illustrated in FIG. 1 is equipped with various work devices such as a plow and a loader to enable various types of work.

As illustrated in FIG. 1, the tractor 100 includes a vehicle body 2, a pair of left and right front wheels 3, and a pair of left and right rear wheels 4. The front wheels 3 support a front portion of the vehicle body 2, and the rear wheels 4 support a rear portion of the vehicle body 2.

A hood 9 is disposed on the front portion of the vehicle body 2 of the tractor 100 and is configured to be opened and closed so as to expose the inside. The hood 9 has a streamline shape, and a front portion of the hood 9 gradually becomes narrow in both of the top-bottom direction (vertical direction) and the left-right direction (lateral direction) toward the front. This shape can achieve reduction of air resistance during travelling and enhancement of aesthetic design.

The hood 9 houses a part of a fuel tank 19 and an engine 5. A fan shroud 110, a radiator 111, a condenser 112, an engine control unit (ECU) 113, an air cleaner 114, battery 115 are disposed ahead of the engine 5. The fan shroud 110, the condenser 112, the engine control unit (ECU) 113, the air cleaner 114, and the battery 115 are arranged in this order from the rear to the front on top of an unillustrated attachment plate fixed to the engine frame 16, and are housed in the hood 9.

The fuel tank 19 is disposed above the engine 5. The fuel tank 19 has a filler opening 19a in an upper portion thereof, and refueling is performed through the filler opening. As illustrated in FIG. 1, the filler opening 19a is disposed to project from an opening formed in an upper portion of the hood 9 so that an operator can perform refueling independently of whether the hood 9 is open or closed.

As illustrated in FIG. 1, a front portion 19b of the fuel tank 19 is disposed above the engine 5 in internal space of the hood 9. A rear portion 19c of the fuel tank 19 is covered with a fuel tank cover 30, and is disposed inside a dashboard 50 disposed on a cabin 6.

The engine 5 is configured as a common rail diesel engine including a plurality of cylinders. Specifically, the engine 5 includes an unillustrated common rail that stores fuel supplied from the fuel tank 19 under high pressure. The fuel supplied from the common rail is ejected by an unillustrated injector disposed for each cylinder into a combustion chamber in the cylinder.

The fan shroud 110 is configured to surround the outer periphery of a cooling fan that is driven by the engine 5, and is disposed ahead of the engine 5. An unillustrated notch through which members of the engine 5 such as an intake pipe 116 pass is formed in an upper right portion of the fan shroud 110. The fan shroud 110 is configured to divide the internal space of the hood 9 into front and rear spaces. Accordingly, devices disposed ahead of the fan shroud 110 (e.g., the radiator 111 and the condenser 112) can be shielded against heat from the engine 5

The radiator 111 is a device that cools cooling water in a water jacket in the engine 5, and is attached to the front surface of the fan shroud 110. An unillustrated circulation path in which cooling water circulates is formed between the radiator 111 and an unillustrated water jacket formed in the engine 5. Cooling water in the water jacket whose temperature has become high because of heat generation by the engine 5 is sent to the radiator 111. The cooling water is cooled by outdoor air taken from an unillustrated front grille while passing through the radiator 111, and then returns to the water jacket again to cool the engine 5.

The condenser 112 is configured as a heat exchanger, and includes, as main components, a tube through which high-pressure liquid refrigerant for use in an air conditioner for performing air conditioning in the cabin 6 passes and a corrugated or plate-type fin configured around the tube. The condenser 112 is supported by an unillustrated condenser frame and is attached to the front of the radiator 111.

The ECU 113 is configured as a small-size computer. Based on information from various sensors attached to the engine 5, the ECU 113 outputs control instructions for controlling the amount of fuel injection, the timing of fuel injection, and so forth, to thereby control an operation of the engine 5.

The air cleaner 114 is configured to house an air cleaner element for removing foreign matter in the air. The air cleaner 114 is connected to the engine 5 through the intake pipe 116, and constitutes a part of an intake structure of the engine 5.

The battery 115 supplies electric power to various electric components included in the tractor 100 (e.g., a cell motor included in the engine 5, headlights of the tractor 100, and the ECU 113).

As illustrated in FIG. 1, the cabin 6 an operator is to get aboard is disposed in a rear portion of the vehicle body 2. A steering wheel 7 to be operated by the operator, a driver seat 8 on which the operator is seated, and various operation devices for performing various operations are provided inside the cabin 6.

Examples of the operation devices include an operation panel 10 disposed ahead of the steering wheel 7. The operation panel 10 is fixed to the dashboard 50 disposed ahead of the steering wheel 7. Measuring instruments for indicating information necessary for traveling of the tractor 100, such as an unillustrated speedometer, a fuel indicator, and a range finder, are disposed on the operation panel 10.

A vehicle body frame constituting a frame of the vehicle body 2 includes an engine frame 16 and a transmission case 18. A front axle case 17 is attached to the bottom of the engine frame 16. The front wheels 3 are attached to the front axle case 17 with a front axle 130 interposed therebetween. The rear wheels 4 are attached to the transmission case 18 with a rear axle 14 interposed therebetween. Spaces above the left and right rear wheels 4 are covered with left and right rear fenders 121.

Figure 6:
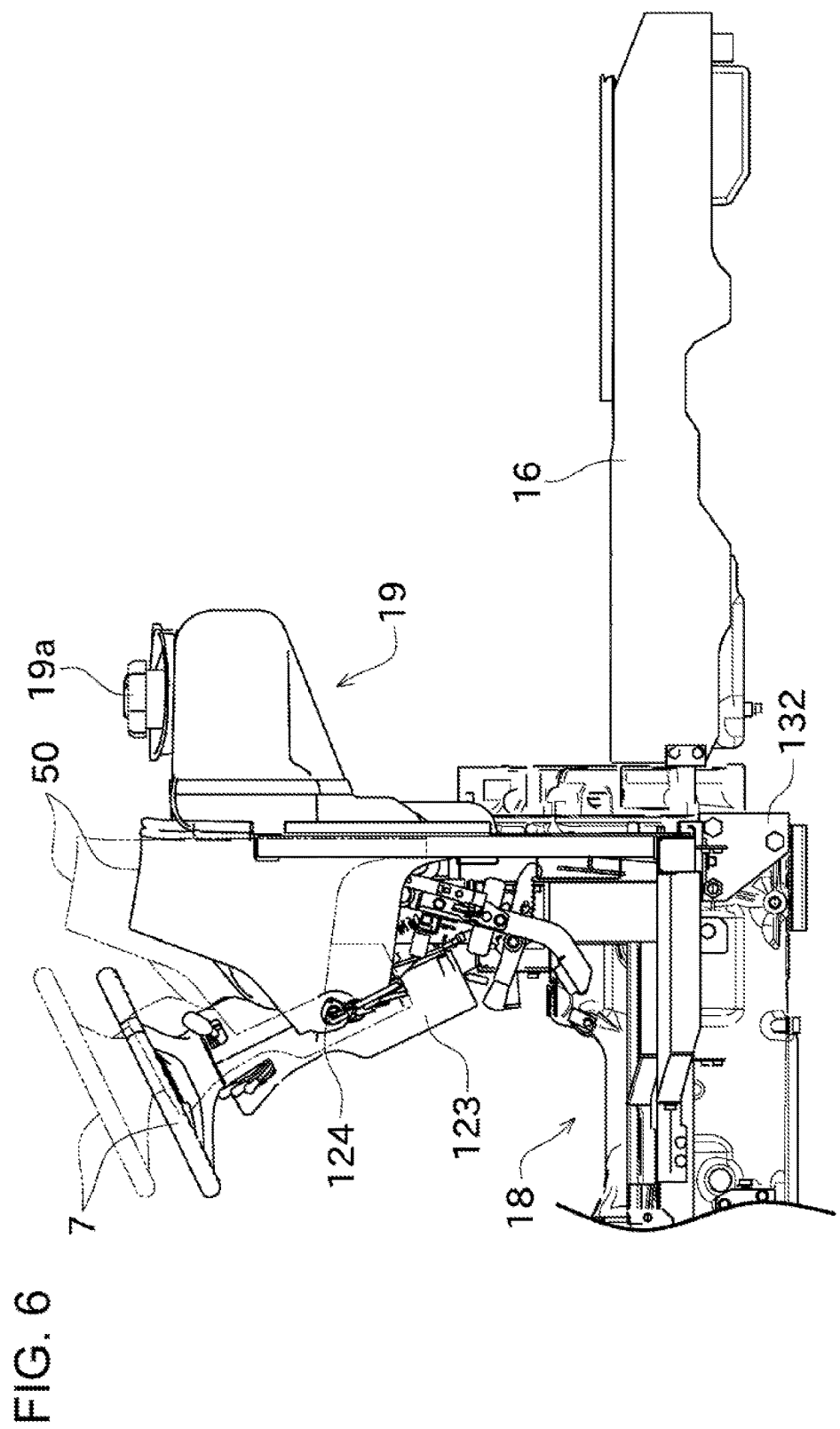
FIG. 6 A left side view illustrating a configuration around the transmission case, a steering wheel, and the dashboard.

As illustrated in FIG. 6, each of the engine frame 16 and the transmission case 18 is formed in a slender shape, and has its longitudinal direction oriented in a front-rear direction (longitudinal direction). The transmission case 18 is fixed to the rear end of the engine frame 16 with an appropriate fixing member interposed therebetween. As described above, the engine frame 16 is supported by the front wheels 3 with the front axle case 17 and the front axle 130 interposed therebetween, and the transmission case 18 is supported by the rear wheels 4 with the rear axle 14 interposed therebetween. In this manner, the front and rear wheels 3 and 4 support the vehicle frame constituted by the engine frame 16 and the transmission case 18.

The transmission case 18 decelerates a driving force from the engine 5 and transmits the force to the front axle case 17 and the rear axle 14. When the operator operates an unillustrated gear-shift member, the gear-shift ratio in the transmission case 18 is thereby changed so that the traveling speed of the tractor 100 can be adjusted.

Figure 2:
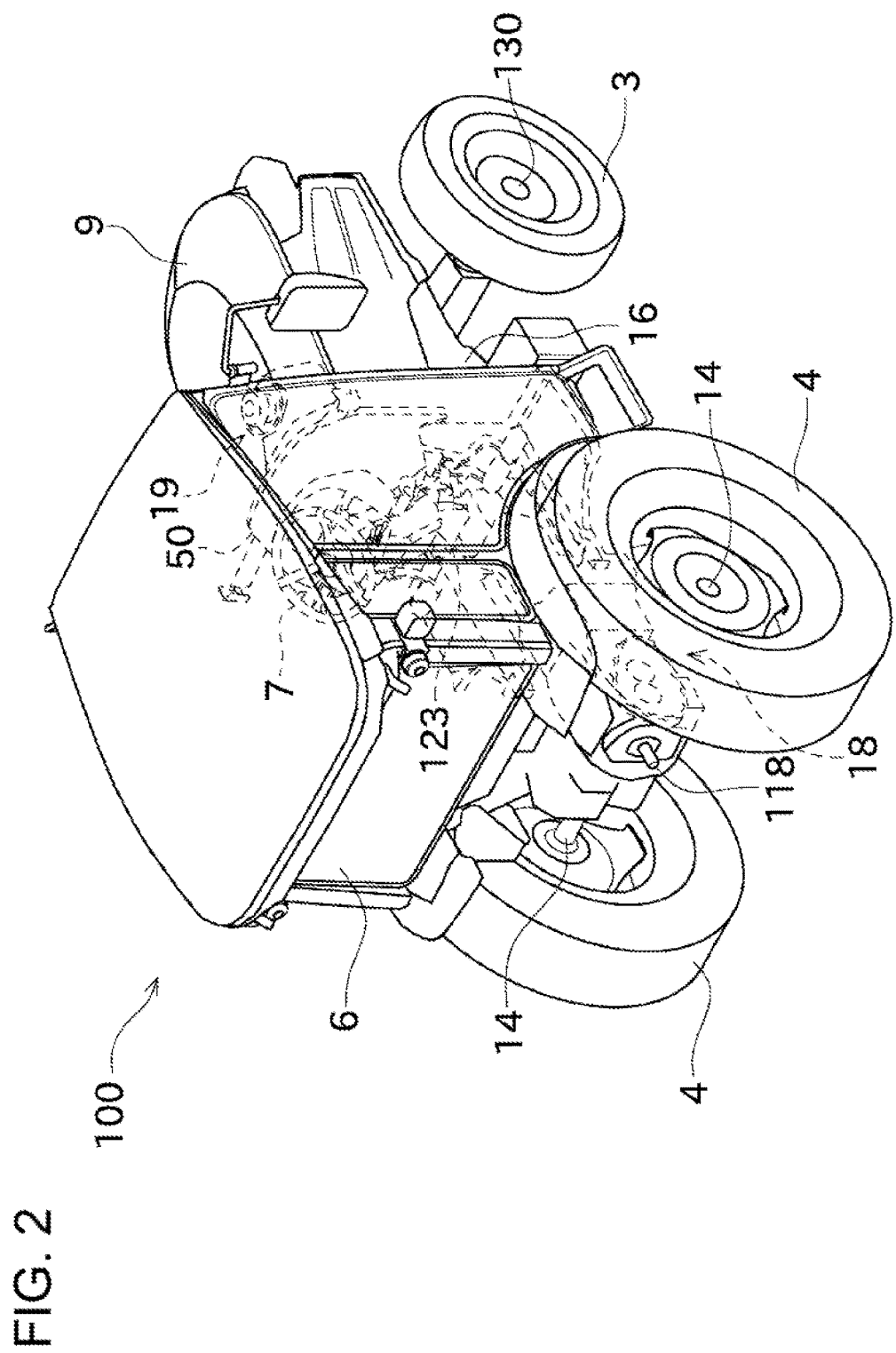
FIG. 2 A perspective view illustrating a configuration of the tractor.

As illustrated in FIG. 2, a PTO shaft 118 is disposed to project from the rear end of the transmission case 18, and the driving force of the engine 5 is transmitted to the PTO shaft 118. The tractor 100 is configured to be equipped with the work devices described above at the rear end of the tractor 100. The PTO shaft 118 can drive the work devices with an unillustrated universal joint, for example.

The thus-configured tractor 100 can perform various types of work such as tillage, seeding, and harvesting, while traveling on a field.

With reference now to FIG. 2, for example, arrangement of the dashboard 50 according to this embodiment and a steering column disposed behind the dashboard 50 will be briefly described. FIG. 2 is a perspective view illustrating a configuration of the tractor 100.

As illustrated in FIG. 2, the dashboard 50 according to this embodiment is disposed behind the hood 9 and is attached to a center of the inner front side of the cabin 6. The dashboard 50 is attached to and covers the fuel tank cover 30 that covers the rear portion 19*c* of the fuel tank 19 (which will be described in detail later).

A cover covering a steering column 11 (steering column cover 123) is disposed behind the dashboard 50. The steering wheel 7 is disposed above the steering column cover 123 and obliquely upward and rearward of the dashboard 50.

A rear portion of the dashboard 50 is formed into such a shape that surrounds the front side of the steering column cover 123 disposed at the lateral center. The steering column cover 123 is disposed to have its front portion partially buried in the rear portion of the dashboard 50. In this manner, the operation unit constituted by the dashboard 50 and the steering wheel 7 attached to an upper portion of the steering column cover 123 can be made compact so that a wide room can be obtained for the operator.

Figure 3:
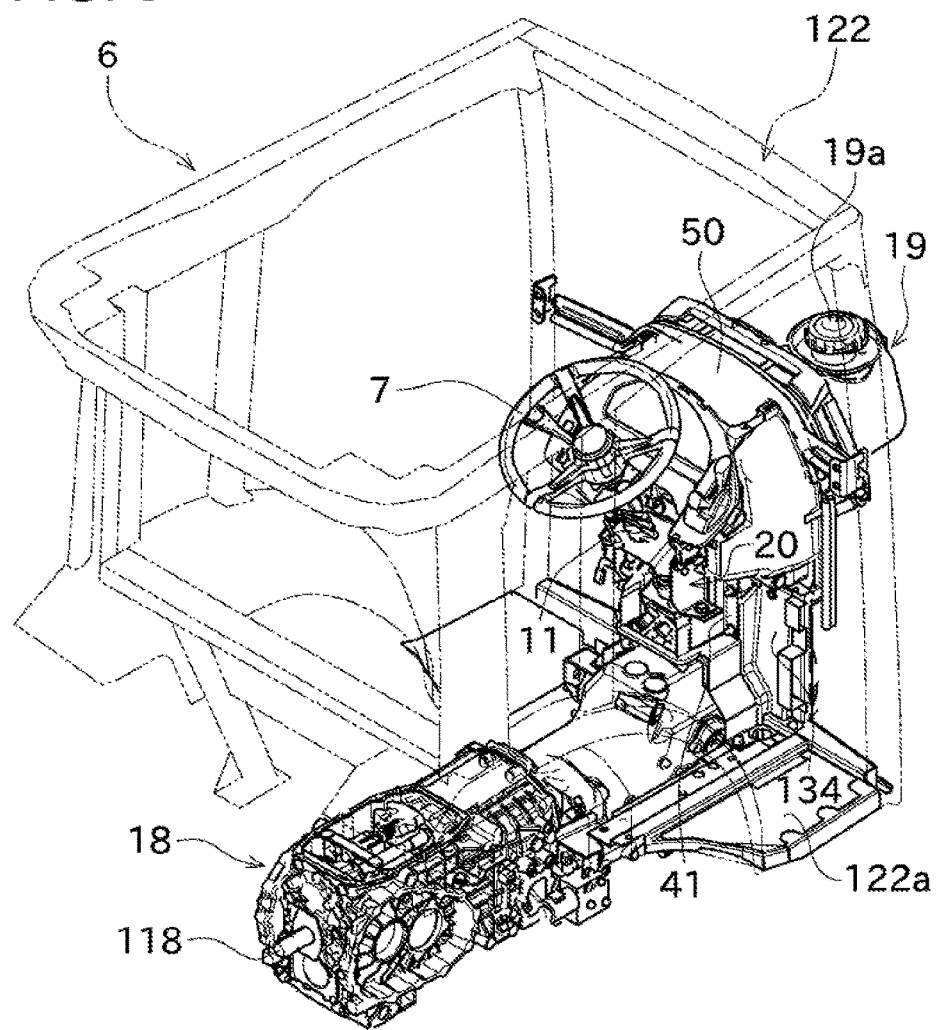
FIG. 3 A perspective view illustrating a state in which a transmission case, a steering column, and a dashboard are disposed in a cabin.
Figure 4:
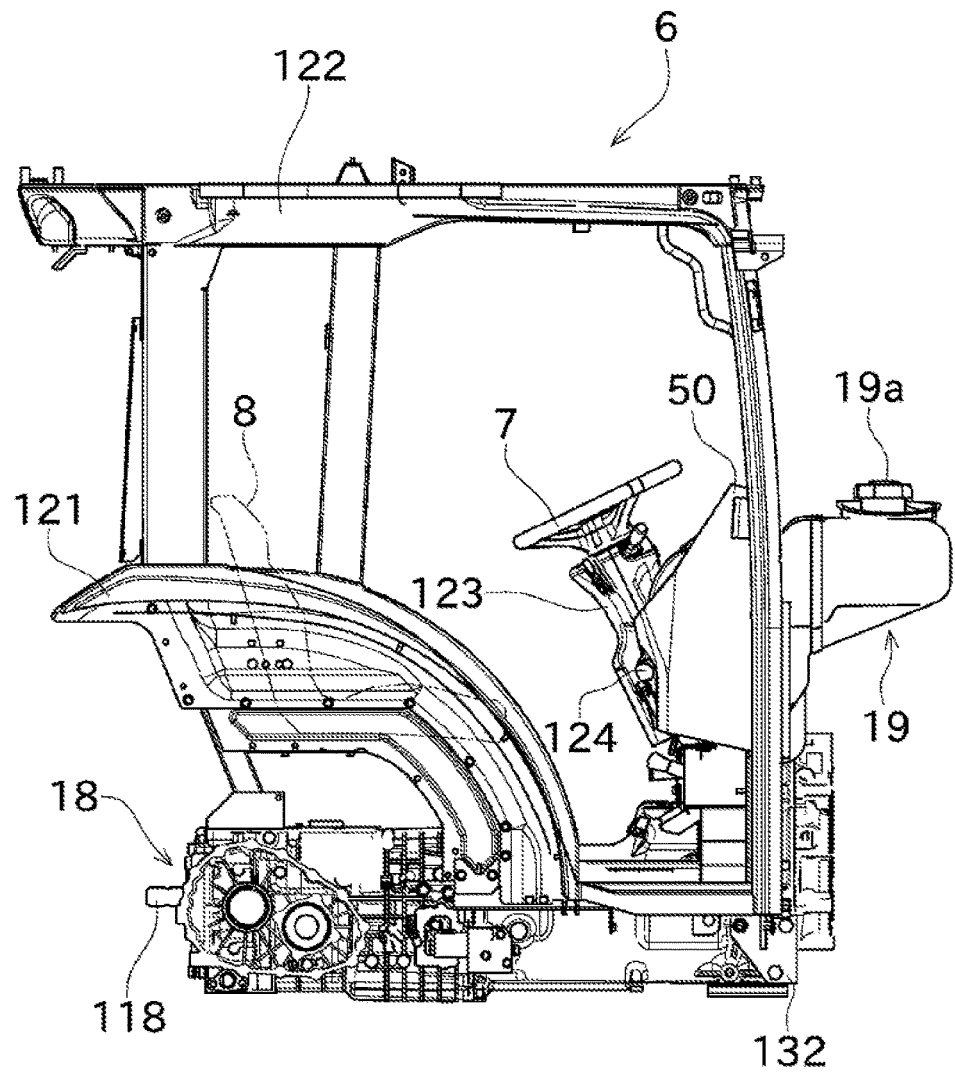
FIG. 4 A left side view illustrating a part of the inside of the cabin.

As illustrated in FIGS. 3 and 4, the cabin 6 includes a skeletal cabin frame 122. The cabin frame 122 is fixed to the transmission case 18 included in the tractor 100. The steering column 11 is supported by and fixed to the cabin frame 122.

Figure 5:
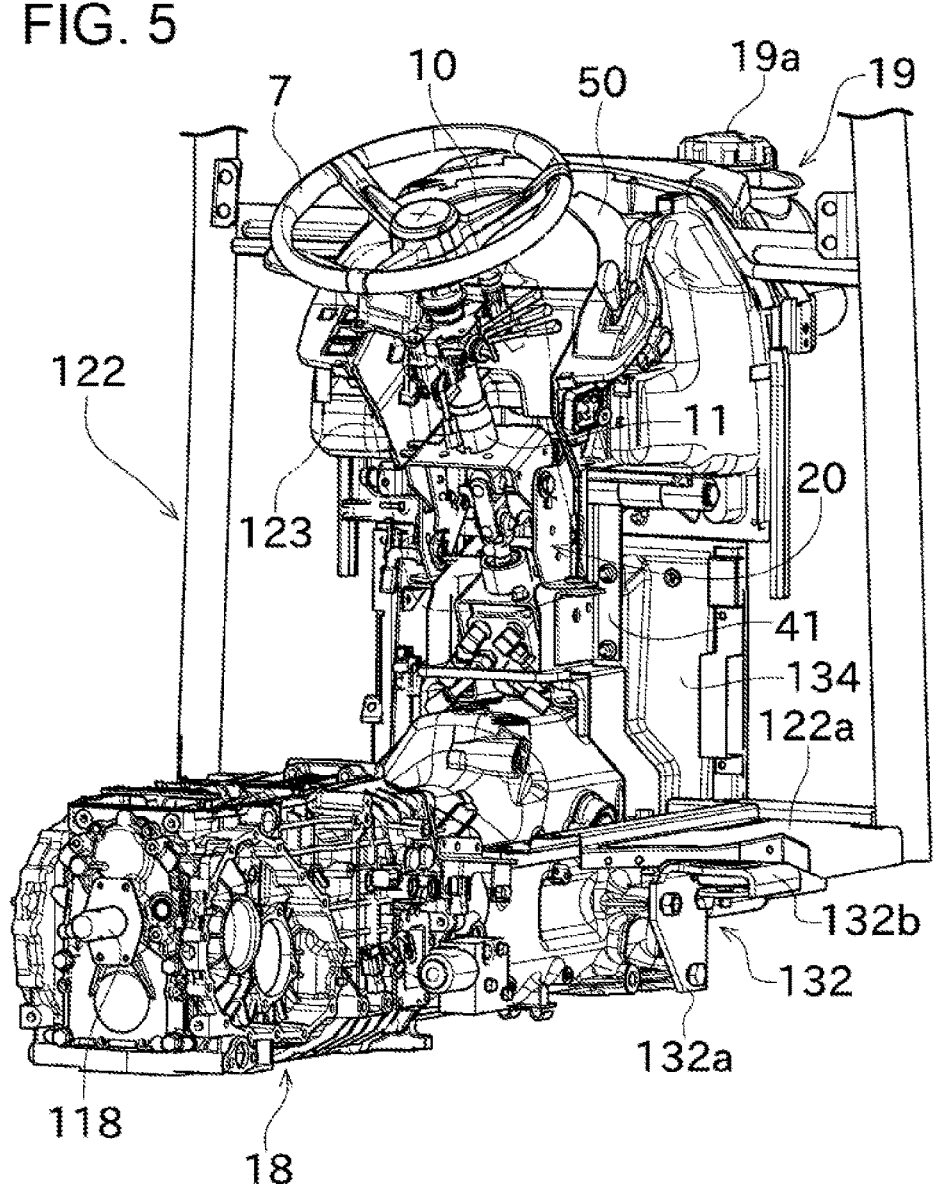
FIG. 5 A perspective view illustrating a configuration around the transmission case, the steering column, and the dashboard.

Specifically, as illustrated in FIG. 5, the cabin frame 122 is fixed to the left and right side surfaces of the transmission case 18 with a pair of left and right frame fixing members 132 interposed therebetween (where FIG. 5 shows only the right frame fixing member 132). The frame fixing members 132 has a substantially L shape, and includes a plate-shaped transmission case attachment portion 132*a* and a plate-shaped frame attachment portion 132*b*. The transmission case attachment portion 132*a* is disposed to have its thickness direction oriented in the vehicle body lateral direction, and is attached to a side surface of the transmission case 18.

On the other hand, the frame attachment portion 132b is disposed to have its thickness direction oriented in the vertical direction, and is attached to the bottom surface of the bottom plate member 122a constituting the cabin frame 122 to support the bottom plate member 122a. In this manner, the cabin frame 122 is fixed to the transmission case 18, and is supported by the rear wheels 4 with the transmission case 18 interposed therebetween.

The steering column 11 is fixed to a bracket 20 illustrated in FIG. 5 (where in FIG. 5, the steering column cover 123 is illustrated in a transparent manner by a chain line in order to ease illustration of the steering column 11). A frame plate member 134 is fixed to the cabin frame 122 with a bolt, for example, and the bracket 20 is fixed to the frame plate member 134 with a support member 41 interposed therebetween. In this manner, the steering column 11 is supported by and fixed to the cabin frame 122 with the member such as the support member 41 interposed therebetween.

As illustrated in FIG. 6, the dashboard 50 according to this embodiment is applicable to tractors conforming to a plurality of different specifications by switching interposition of dashboard support members 40 described later between present and absent. The steering column 11 and the steering column cover 123 are also applicable to tractors conforming to a plurality of different specifications by appropriately changing the attachment positions thereof.

Figure 7:
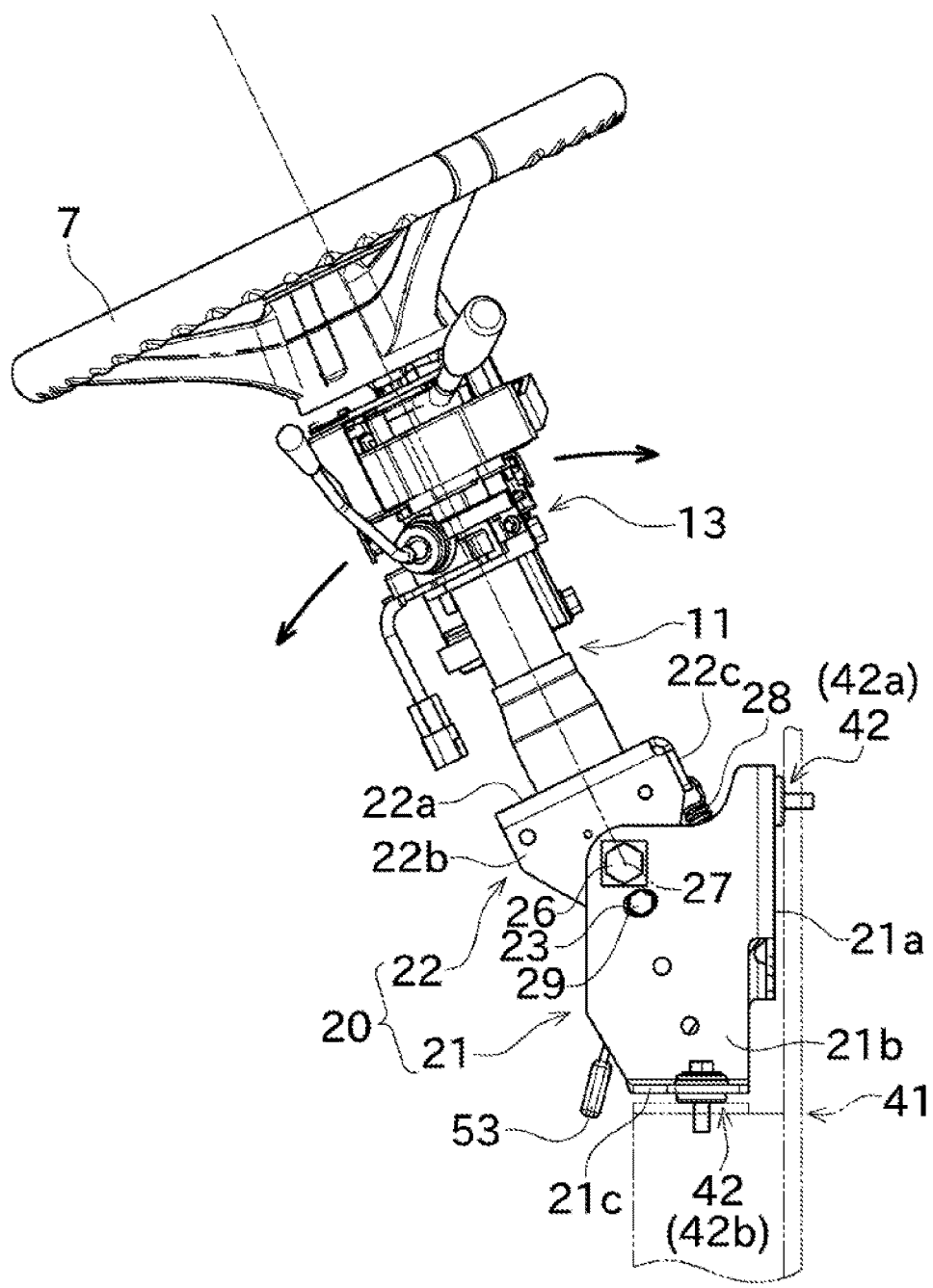
FIG. 7 A right side view illustrating a configuration around the steering column and a bracket.
Figure 8:
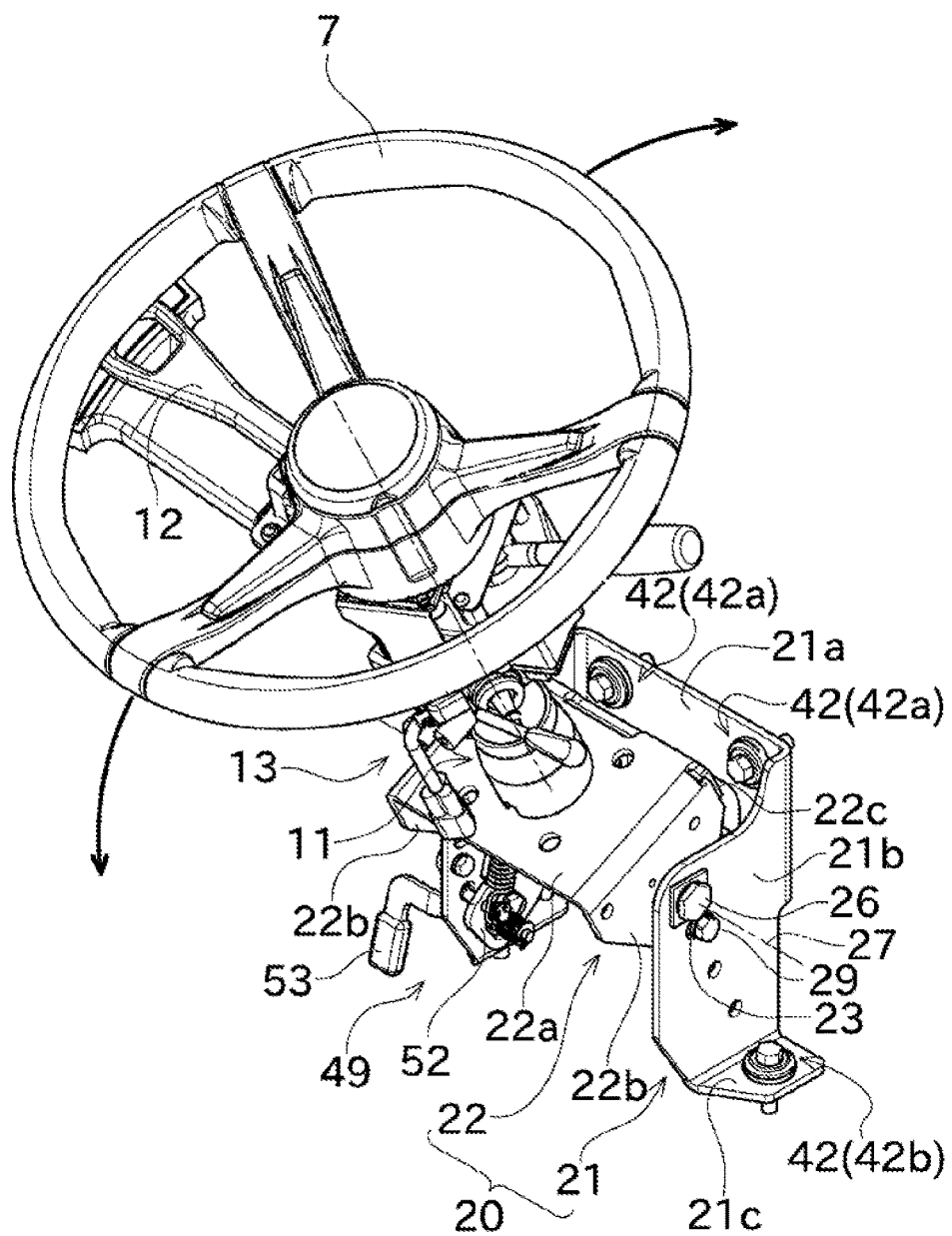
FIG. 8 A perspective view illustrating the configuration around the steering column and the bracket.

With reference now to FIGS. 7 and 8, configurations of the steering column 11 and the bracket 20 disposed in the dashboard 50 will be described. FIG. 7 is a left side view illustrating a configuration around the steering column 11 and the bracket 20. FIG. 8 is a perspective view illustrating the configuration around the steering column 11 and the bracket 20. FIGS. 7 and 8 illustrate a state in which the dashboard 50 is detached.

The slender cylindrical steering column 11 is disposed inside the dashboard 50. The steering column 11 is disposed below the steering wheel 7 and oriented in a direction that coincides with the rotation axis of the steering wheel 7. The lower end of the steering column 11 is supported by the bracket 20.

The steering column 11 is formed into a hollow shape, and an unillustrated rod-shaped steering shaft is disposed inside the steering column 11. The steering wheel 7 is attached to an upper portion of the steering shaft. A lower portion of the steering shaft is inserted in the steering column 11, and is rotatably supported with respect to the steering column 11. A reverser lever 12 for operating an unillustrated forward/reverse-movement switching mechanism included in the tractor 100 is attached to an upper portion of the steering column 11. A known telescopic device 13 for adjusting the position of the steering wheel 7 in the longitudinal direction of the steering column 11 is disposed on the steering column 11.

The steering wheel 7 is configured to have a round wheel shape and to be rotatably operated to both of the left and right. Rotation of the steering wheel 7 is input to a steering valve unit included in an unillustrated power steering device through the steering shaft. The steering valve unit switches supply of hydraulic oil to cylinders of the power steering device. In this manner, in accordance with the direction and angle of rotational operation of the steering wheel 7, the cylinder is driven so that the orientation of the front wheels 3 is changed, and thereby, the traveling direction of the tractor 100 can be changed.

The reverser lever 12 is disposed to the upper left of the steering column 11. The reverser lever 12 is attached to the steering column 11 to project to the left, and is configured to be rotatable about a substantially vertical axis. The tractor 100 includes an unillustrated reverser switch for detecting an operation of the reverser lever 12. In this configuration, an operator operates the reverser lever 12 forward or rearward so that the unillustrated forward/reverse-movement switching mechanism included in the tractor 100 is thereby controlled, and the traveling direction of the tractor 100 can be switched forward or rearward.

The bracket 20 supports the steering column 11 with respect to the support member 41 fixed to the engine frame 16 of the tractor 100. As illustrated in FIGS. 7 and 8, the bracket 20 includes a base member 21 and a movable member 22.

The base member 21 is attached to the support member 41 with a plurality of (four in this embodiment) vibration-isolating rubber members 42 interposed therebetween.

The movable member 22 is attached to an upper portion of the base member 21 with a pair of left and right shaft members 26 interposed therebetween. The movable member 22 is rotatably supported about the axis of the shaft members 26 (rotation axis 27 oriented in a lateral horizontal direction). The rotation axis 27 corresponds to a tilt axis of a tilt mechanism included in the bracket 20. The lower end of the steering column 11 is fixed to an upper portion of the movable member 22. In this configuration, by rotating the movable member 22, the steering column 11 and the steering wheel 7 can be tilted toward the rear or raised toward the front (tilt function). The use of the tilt mechanism of the bracket 20 and a wheel height adjustment mechanism by the telescopic device 13 can appropriately adjust the position of the steering wheel 7 in accordance with a physical constitution, for example, of the operator.

Figure 9:
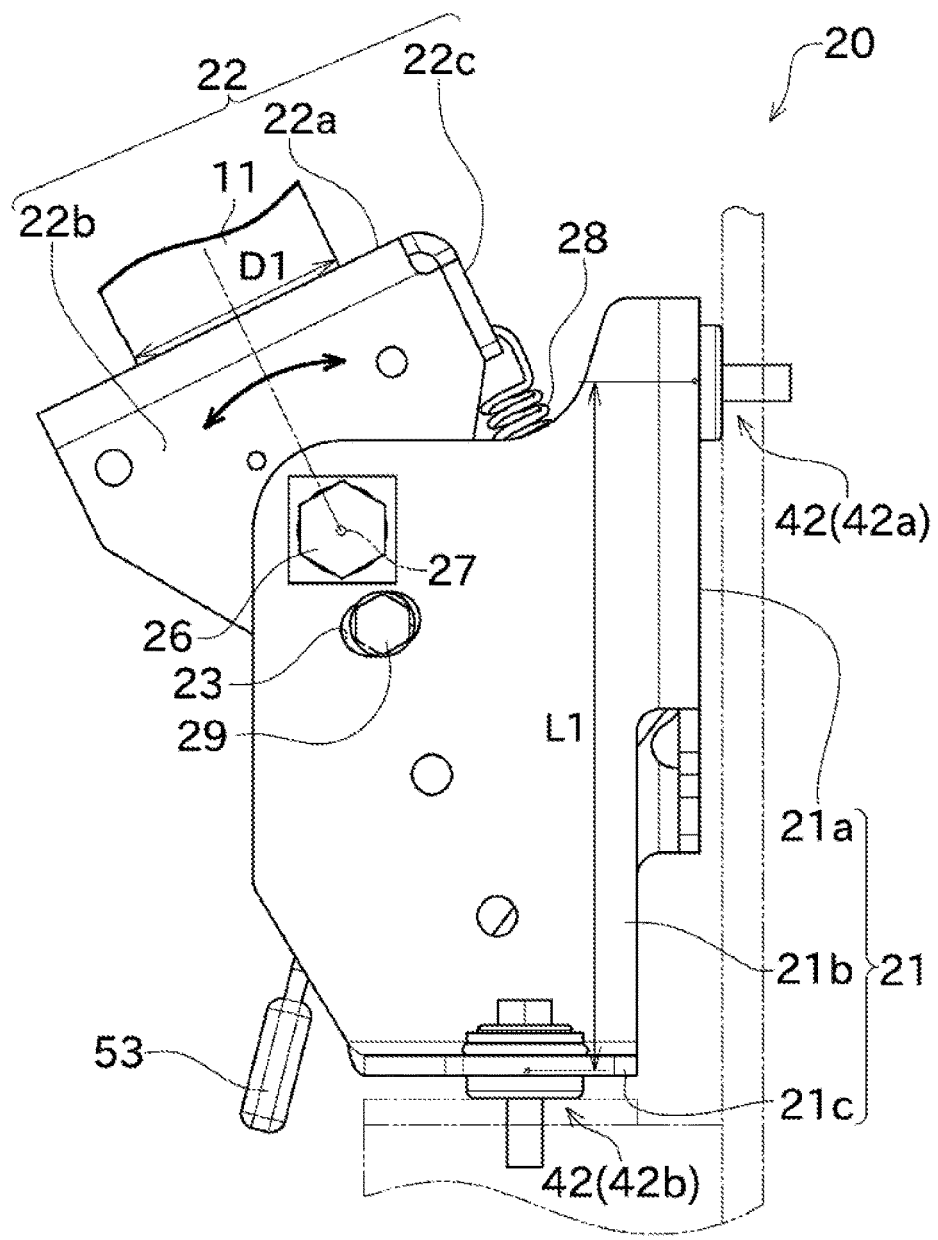
FIG. 9 A left side view of the bracket.
Figure 10:
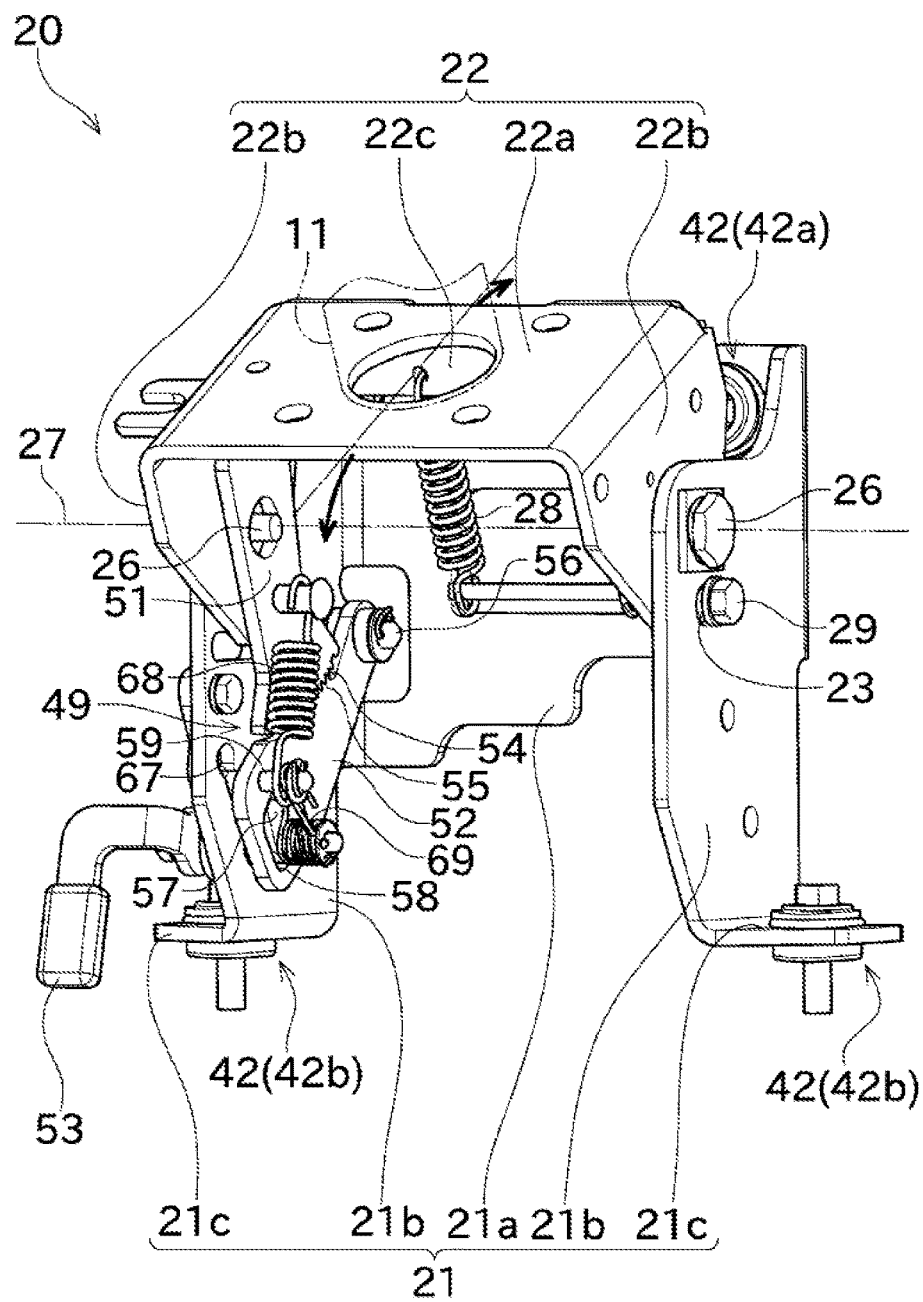
FIG. 10 A perspective view of the bracket.

With reference now to FIGS. 9 and 10, a detailed configuration of the bracket 20 will be described. FIG. 9 is a left side view of the bracket 20. FIG. 10 is a perspective view of the bracket 20.

As illustrated in FIGS. 9 and 10, the base member 21 included in the bracket 20 is configured as a plate-shaped member that is so bent at a plurality of point as to have an arch shape in front view. The base member 21 integrally includes a front attachment portion 21a, a pair of left and right shaft support portions 21b, and a pair of left and right lower attachment portions 21c.

The front attachment portion 21a is formed into a plate shape having its thickness direction oriented in the longitudinal direction. An upper portion of the front attachment portion 21a is attached to the support member 41 with a pair of left and right vibration-isolating rubber members 42 interposed therebetween.

Each of the pair of shaft support portions 21b is formed into a plate shape having its thickness direction oriented in the lateral direction. Each of the shaft support portions 21b is disposed to extend rearward from each lateral end of the front attachment portion 21a and then extend downward. The shaft support portions 21b is connected to the front attachment portion 21a to be perpendicular to the front attachment portion 21a in plan view. The pair of shaft support portions 21b is arranged in parallel with each other, and an appropriate space where the movable member 22 is to be disposed is formed between the pair of shaft support portions 21b. To each of the shaft support portions 21b, a corresponding one of the shaft members 26 for supporting the movable member 22 is attached.

Each of the pair of lower attachment portions 21c is formed into a plate shape whose thickness direction is oriented in the vertical direction. Each of the lower attachment portions 21c is disposed to project outward in the lateral direction from the lower end of the corresponding one of the pair of shaft support portions 21b. The lower attachment portion 21c is connected to the shaft support portion 21b to be perpendicular to the shaft support portion 21b in front view. Each of the pair of left and right lower attachment portions 21c is attached to the support member 41 with the vibration-isolating rubber members 42 interposed therebetween.

Similarly to the base member 21, the movable member 22 is configured as a plate-shaped member that is bent at a plurality of points. The base member 21 integrally includes a column attachment portion 22a, a pair of left and right arm portions 22b, and a spring stopper portion 22c.

The column attachment portion 22a is formed into a plate shape whose thickness direction is orthogonal to the rotation axis 27 of the movable member 22. The column attachment portion 22a is formed into a rectangular shape, and the lower end of the steering column 11 is fixed to a center of the rectangular shape by an appropriate method.

Each of the arm portions 22b is formed into a plate shape whose thickness direction is oriented in the lateral direction. Each of the arm portions 22b is disposed to extend from the corresponding one of the lateral ends of the column attachment portion 22a toward the rotation axis 27 of the movable member 22 (downward). The pair of arm portions 22b is disposed in parallel with each other, and the unillustrated steering valve unit is disposed between the pair of arm portions 22b. Each of the arm portions 22b is rotatably supported with respect to the corresponding shaft support portion 21b of the base member 21 with the corresponding shaft member 26 interposed therebetween. A stopper member 29 is attached to one of the arm portions 22b (right arm portion 22b in this embodiment). This stopper member is configured to project outward in the lateral direction (to the right) through an arc-shaped elongated hole 23 formed through the shaft support portion 21b of the base member 21. The stopper member 29 and the elongated hole 23 restrict an angle stroke in which the movable member 22 rotates within a predetermined range.

The spring stopper portion 22c is formed into a plate shape that is perpendicular to any of the column attachment portion 22a and the arm portions 22b. The spring stopper portion 22c is disposed to extend downward from the front end of the column attachment portion 22a.

As illustrated in FIG. 10, to one of the lateral ends (left end in this embodiment) of the bracket 20, a lock mechanism 49 for holding the angle of the movable member 22 (and further the angles of the steering column 11 and the steering wheel 7) relative to the base member 21 is attached. The lock mechanism 49 includes a first lock member 51, a second lock member 52, and an unlocking lever 53.

The first lock member 51 is formed into a slender plate shape, and is fixed to the inner surface of the arm portion 22b at one of the lateral end (left end in this embodiment) of the movable member 22. Accordingly, the first lock member 51 rotates about the rotation axis 27 integrally with the movable member 22. An arc-shaped gear 54 is formed at the lower end of the first lock member 51.

The second lock member 52 is formed into a slender plate shape, and is disposed near the inner surface of the shaft support portion 21b at one of the lateral ends (left end in this embodiment) of the base member 21. One end (front end) of the second lock member 52 is rotatably supported with interposition of a spindle 56 attached to the shaft support portions 21b. The other end (rear end) of the second lock member 52 includes a rectangular cam hole 58 that houses a cam plate 57 coupled to the unlocking lever 53. Gear teeth 55 that can mesh with the arc-shaped gear 54 of the first lock member 51 are formed in an upper edge of a laterally intermediate portion of the second lock member 52. In addition, a round rod-shaped restriction shaft 59 is fixed to the second lock member 52. An end of a spring 68 of a coil spring type is attached to the restriction shaft 59. This spring 68 is configured as a tension spring and exerts a spring force in a direction in which the second lock member 52 is moved toward the first lock member 51 (direction in which the gear teeth 55 and the gear 54 mesh with each other, specifically, upward). The restriction shaft 59 projects to penetrate an elongated hole 67 formed through the left shaft support portion 21b. The restriction shaft 59 and the elongated hole 67 restrict a moving stroke of the second lock member 52 within a predetermined range.

The unlocking lever 53 is attached to be rotatable with respect to the left shaft support portion 21b of the base member 21. The unlocking lever 53 is coupled to the triangular cam plate 57 rotatably supported inside the left shaft support portion 21b. Accordingly, when the operator lifts the unlocking lever 53, the cam plate 57 can thereby be rotated. A return spring 69 of a torsion coil spring type is attached to the cam plate 57, and exerts a spring force in a direction against an operation of lifting the unlocking lever 53.

In the configuration described above, normally, since the gear teeth 55 of the second lock member 52 biased upward by the spring 68 normally mesh with the gear 54 of the first lock member 51, rotation of the movable member 22 is inhibited (locked state). On the other hand, when the operator lifts the unlocking lever 53, the cam plate 57 thereby rotates and pushes the second lock member 52 down through the cam hole 58. Accordingly, the gear teeth 55 and the gear 54 are unmeshed so that the movable member 22 can rotate (unlocked state).

A pair of left and right tension springs (elastic members) 28 is disposed between the front attachment portion 21a of the base member 21 and the spring stopper portion 22c of the movable member 22. The tension spring 28 exerts a force on the movable member 22 in a direction in which the movable member 22 is rotated clockwise in FIG. 7 (i.e., in a direction against a direction in which the movable member 22 falls counterclockwise in FIG. 7 against the gravity). In this manner, when the lock mechanism 49 is unlocked for tilt adjustment of the steering wheel 7, the steering column 11 and the steering wheel 7 can be moved to rise with a small force. In addition, vibrations occurring in the bracket 20 can be reduced by the tension spring 28 so that vibration isolation of the steering column 11 can be enhanced.

Figure 11:
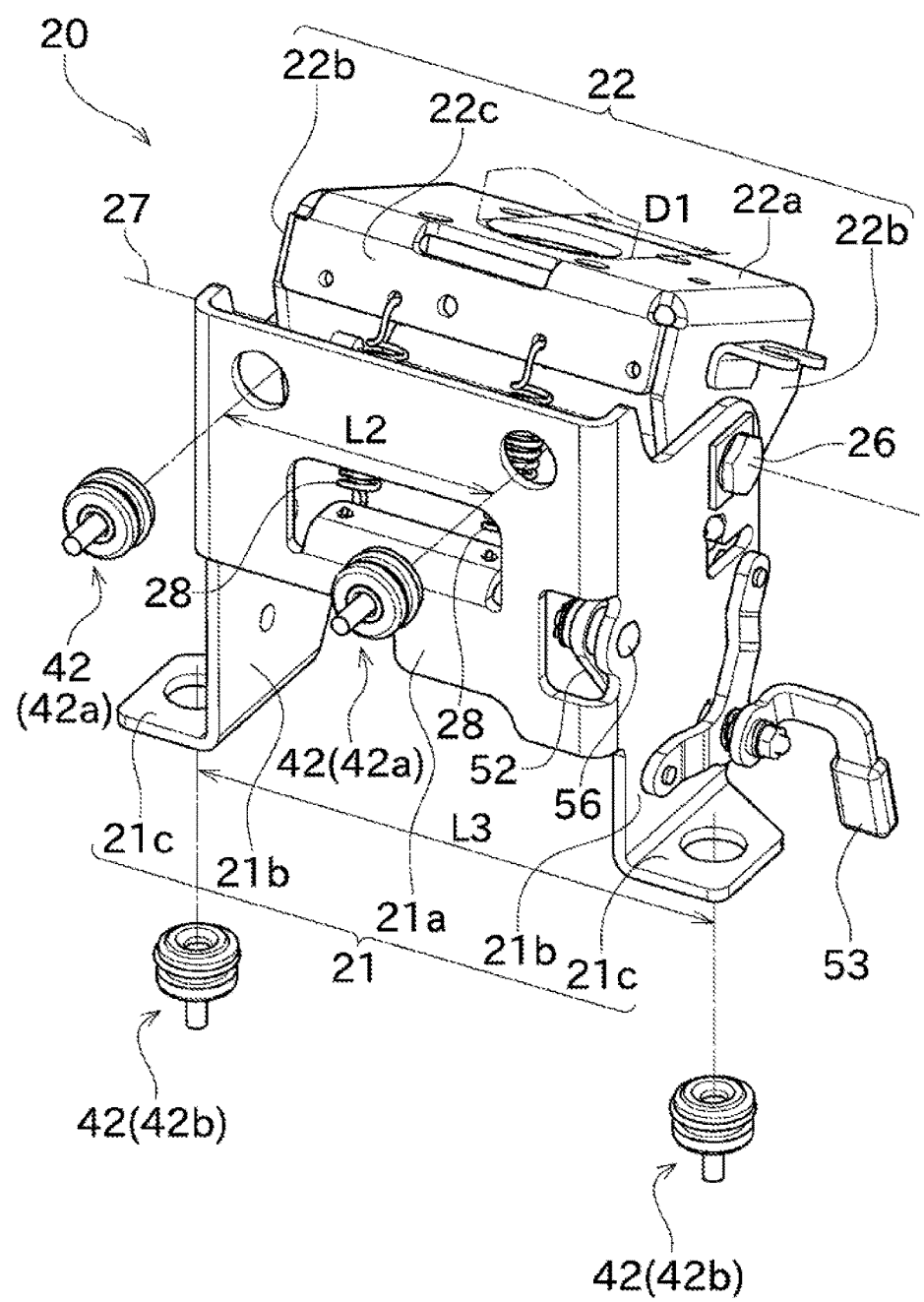
FIG. 11 A perspective view illustrating arrangement of vibration-isolating rubber members with respect to the bracket.

With reference now to FIG. 11, arrangement of the four vibration-isolating rubber members 42 attached to the bracket 20 will be described. FIG. 11 is a perspective view illustrating arrangement of the vibration-isolating rubber members 42 with respect to the bracket 20.

As illustrated in FIG. 7, the vibration-isolating rubber members 42 are disposed between the support member 41 and the base member 21 of the bracket 20. As illustrated in FIG. 11, for example, each of the vibration-isolating rubber members 42 has a configuration in which a substantially cylindrical rubber body is disposed around a bolt shank. The base member 21 has four circular holes, and a ring-shaped groove formed in the outer peripheral surface of the rubber body is fixed to each circular hole. In this state, the bolt shank is bolted to the support member 41 so that the bracket 20 can be supported by the support member 41 in a vibration controlled manner.

Two of the four vibration-isolating rubber members 42 are attached to the front attachment portion 21a of the base member 21 with their bolt shanks oriented in the longitudinal direction. The other two vibration-isolating rubber members 42 are attached to the left and right lower attachment portions 21c with their bolt shanks oriented in the vertical direction. Since the lower attachment portions 21c are disposed below the front attachment portion 21a, as illustrated in FIG. 9, two of the four vibration-isolating rubber members 42 are disposed at a relatively high position, and the other two vibration-isolating rubber members 42 are disposed at a relatively low position.

Furthermore, upper two of the four vibration-isolating rubber members 42 are disposed at a position higher than the rotation axis 27 of the movable member 22 in the bracket 20, and the other lower two of the four vibration-isolating rubber members 42 are disposed at a position lower than the rotation axis 27. In addition, a height difference between the vibration-isolating rubber members 42 at two different heights (height difference between center points of these rubber bodies) L1 is larger than a diameter D1 of the bottom surface of the steering column 11 (i.e., L1>D1). In this manner, the vibration-isolating rubber members 42 are disposed to be sufficiently separated from each other so that movement of the bracket 20 due to deformation of the vibration-isolating rubber members 42 can be reduced, as compared to a conventional case where vibration-isolating rubber members are disposed at a tilt fulcrum of the steering column 11. Consequently, stability of the bracket 20 can be enhanced so that vibration isolation of the steering column 11 and the steering wheel 7 can be enhanced.

As illustrated in FIG. 11 that is a perspective view of the bracket 20 taken from the front, the upper two vibration-isolating rubber members 42 are disposed to be separated from each other in the lateral direction, and a distance between the upper two vibration-isolating rubber members 42 in the lateral direction (distance between the center points of these rubber bodies) L2 is larger than the diameter D1 of the bottom surface of the steering column 11 (i.e., L2>D1). Similarly, the lower two vibration-isolating rubber members 42 are disposed to be separated from each other in the lateral direction, and a distance between the lower two vibration-isolating rubber members 42 in the lateral direction (distance between the center points of these rubber bodies) L3 is larger than the diameter D1 of the bottom surface of the steering column 11 (i.e., L3>D1). In this manner, the vibration-isolating rubber members 42 are disposed to also be separated from each other in the lateral direction so that the bracket 20 can be made more stable against vibrations.

Furthermore, as illustrated in FIG. 9, the upper two vibration-isolating rubber members 42 and the lower two vibration-isolating rubber members 42 are disposed at different positions in the height direction and also at different positions in the longitudinal direction. Although the upper two vibration-isolating rubber members 42 and the lower two vibration-isolating rubber members 42 have the same configuration, the bolt shanks are oriented in different directions. Accordingly, vibration isolation of the bracket 20 can be further enhanced.

Figure 12:
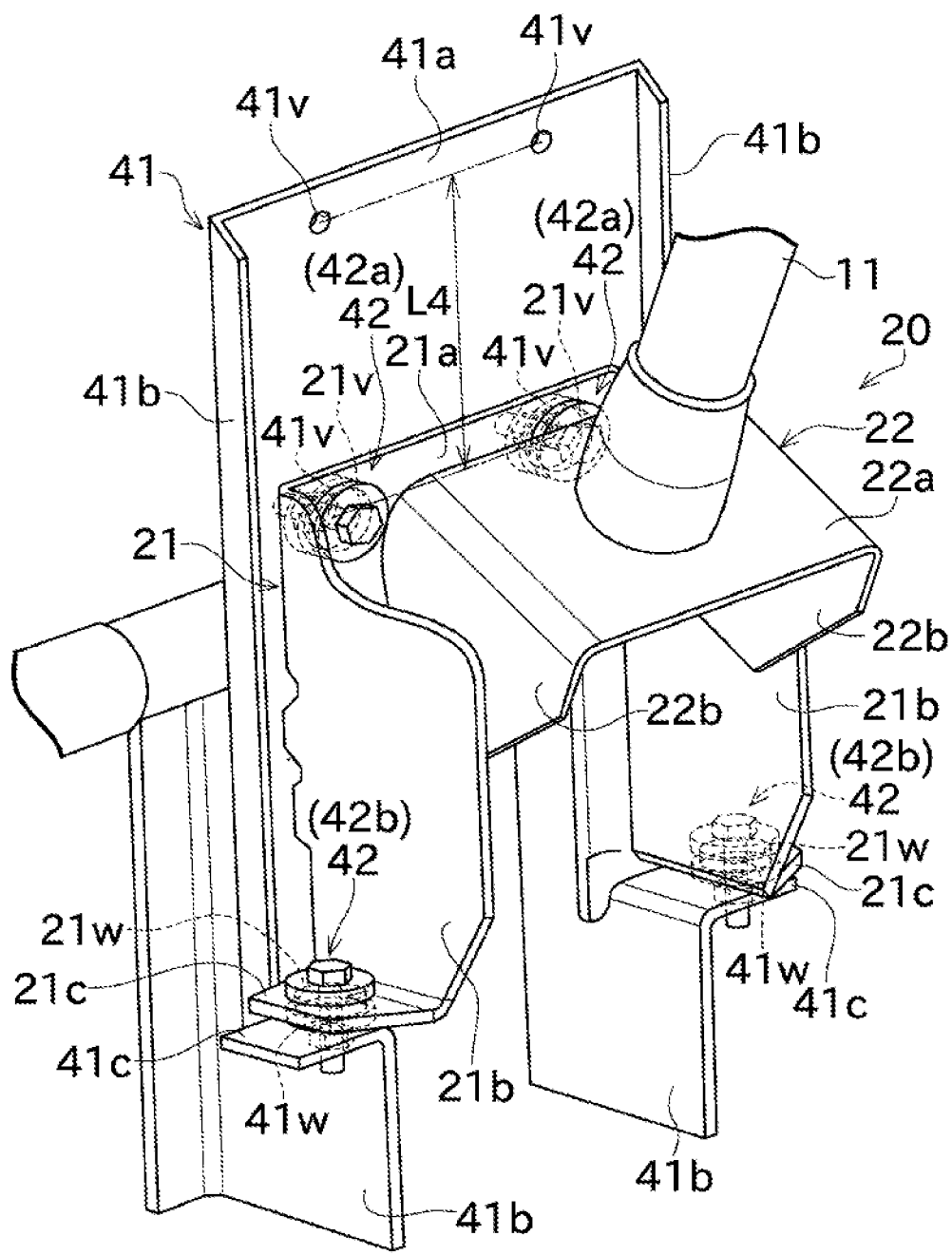
FIG. 12 A perspective view illustrating states of a support member and the bracket in a tractor conforming to a specification in which the position of the steering column is low.
Figure 13:
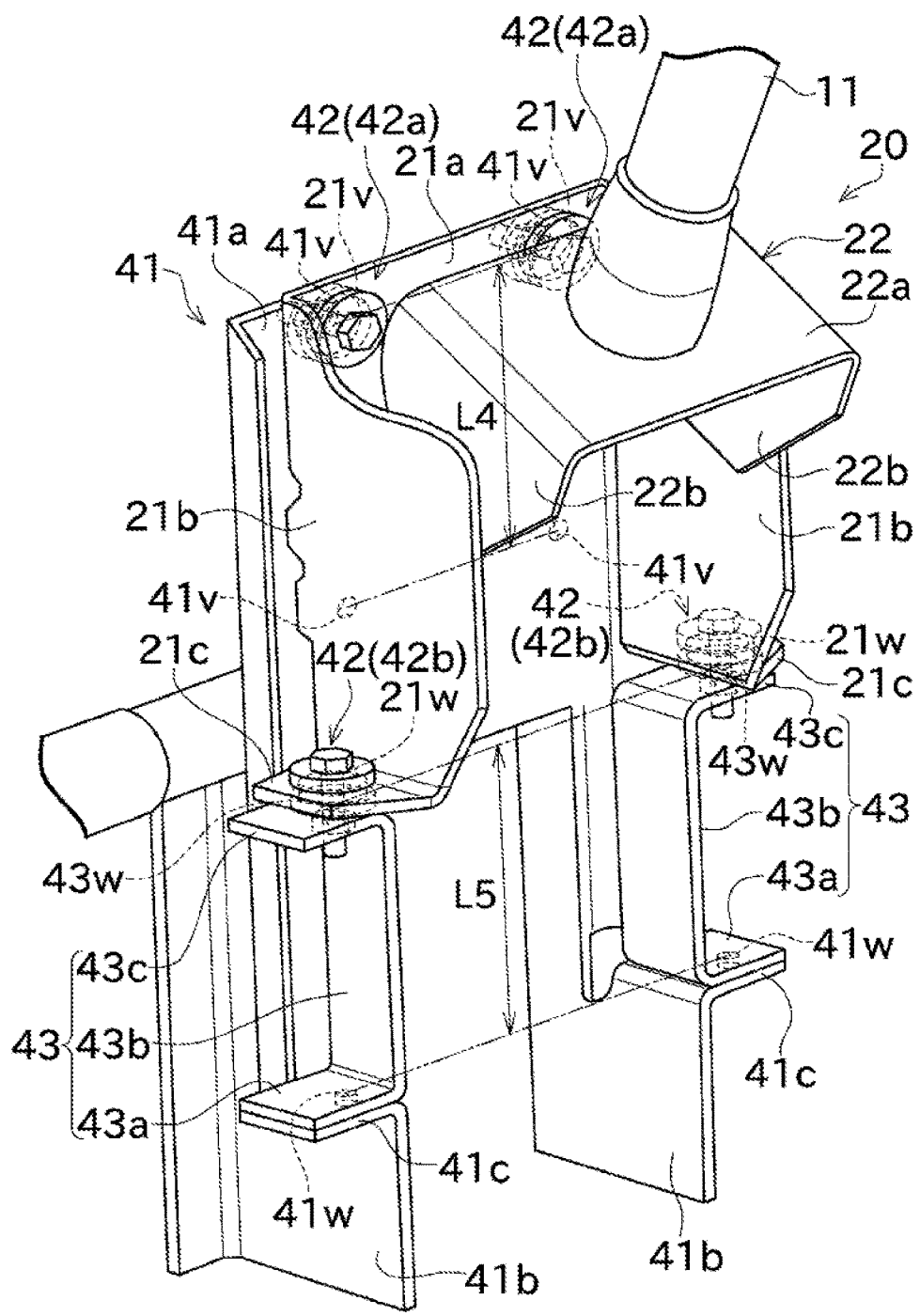
FIG. 13 A perspective view illustrating states of the support member and the bracket in a tractor conforming to a specification in which the position of the steering column is high.

With reference now to FIGS. 12 and 13, a configuration in which the bracket 20 can be fixed to the support member 41 at two levels of height will be described. FIG. 12 is a perspective view illustrating the states of the support member 41 and the bracket 20 in a tractor conforming to a specification in which the steering column 11 is low. FIG. 13 is a perspective view illustrating the states of the support member 41 and the bracket 20 in a tractor conforming to a specification in which the steering column 11 is high. In FIGS. 12 and 13, to ease understanding of the configuration of fixing the support member 41 and the bracket 20 to each other, the shaft members 26 and the lock mechanism 49, for example, are not shown.

As illustrated in FIGS. 12 and 13, the support member 41 to which the bracket 20 is fixed is configured as a plate-shaped member that is bent at a plurality of points to have an arch shape in front view.

The support member 41 integrally includes a front surface portion 41a, a pair of left and right side surface portions 41b, and a pair of left and right bent portions 41c.

The front surface portion 41a is formed into a plate shape whose thickness direction is oriented in the longitudinal direction. The front surface portion 41a has a plurality of attachment holes 41v for attaching a pair of left and right vibration-isolating rubber members 42a. The positions of the attachment holes 41v correspond to circular holes 21v formed in the front attachment portion 21a of the base member 21. Two pairs of left and right attachment holes 41v are disposed in the front surface portion 41a. In other words, the front surface portion 41a has a pair of upper left and right attachment holes 41v and a pair of lower left and right attachment holes 41v. The four attachment holes 41v and 41w have the same shape.

One pair (set) of attachment holes 41v and the other pair (set) of attachment holes 41v are disposed at the same positions in the lateral direction and the longitudinal direction and at different positions in the vertical direction. The upper pair of attachment holes 41v and the lower pair of attachment holes 41v are disposed at different heights by L4. The upper pair of attachment holes 41v is formed near the upper end of the support member 41.

Each of the pair of side surface portions 41b is formed into a plate shape whose thickness direction is oriented in the lateral direction. Each side surface portion 41b extends rearward from a corresponding one of the lateral ends of the front surface portion 41a, then downward, and then further rearward. Each of the side surface portions 41b is connected to the front surface portion 41a perpendicularly to the front surface portion 41a in plan view. The pair of side surface portions 41b is parallel to each other, and an appropriate space where the front attachment portion 21a of the bracket 20 is formed.

Each of the pair of bent portions 41c is formed into a plate shape whose thickness direction is oriented in the vertical direction. Each of the bent portions 41c is disposed to project outward in the lateral direction from the upper end of a portion extending rearward from the lower end of a corresponding one of the pair of side surface portions 41b. The bent portion 41c is connected to the side surface portion 41b perpendicularly to the side surface portion 41b in plan view. Each of the bent portions 41c has an attachment hole 41w for attaching a bolt shank of the vibration-isolating rubber member 42b.

In this configuration, in the case of fabricating a tractor conforming to the specification in which the position of the steering column 11 is low, the rubber bodies of the vibration-isolating rubber members 42b are inserted in the circular holes 21w in the pair of left and right lower attachment portions 21c of the bracket 20, and the bolt shanks of the vibration-isolating rubber members 42b are bolted to the attachment holes 41w formed in the bent portions 41c of the support member 41. In addition, rubber bodies of the vibration-isolating rubber members 42a are inserted in the pair of left and right circular holes 21v in the front attachment portion 21a of the bracket 20, and the bolt shanks of the vibration-isolating rubber members 42a are bolted to the lower pair of attachment holes 41v in the two sets (four) of attachment holes 41v formed in the front surface portion 41a of the support member 41. In the manner described above, as illustrated in FIG. 12, a specification in which the steering column 11 is at a relatively low position can be obtained.

On the other hand, to fabricate a tractor conforming to a specification in which the position of the steering column 11 is large, as illustrated in FIG. 13, a spacer (attachment member) 43 is fixed to each of the pair of left and right bent portions 41c of the support member 41.

The spacer 43 is configured by appropriately bending a metal plate member, and includes a base portion (fixing portion) 43a, an intermediate portion (connection portion) 43b, and a bent portion (parallel portion) 43c.

The base portion 43a is formed into a plate shape whose thickness direction is oriented in the vertical direction. The intermediate portion 43b is formed into a shape whose thickness direction is oriented in the lateral direction, and extends upward from an end of the laterally inner side of the base portion 43a. The bent portion 43c is formed into a plate shape whose thickness direction oriented in the vertical direction. Each bent portion 43c is disposed to project from the upper end of the intermediate portion 43b outward in the lateral direction. The bent portion 43c has an attachment hole 43w for attaching the bracket 20 with the vibration-isolating rubber member 42b interposed therebetween.

The base portion 43a and the bent portion 43c are connected to the intermediate portion 43b perpendicularly to the intermediate portion 43b in plan view. The bent portion 43c and the base portion 43a are oriented in parallel with each other. A height difference L5 between the upper surface of the bent portion 43c and the lower surface of the base portion 43a is equal to the height difference L4 between the upper two (set) of the attachment holes 41v and the lower two (set) of the attachment holes 41v among the four attachment holes 41v described above (i.e., L5=L4).

The base portions 43a of the spacers 43 having the configuration described above are fixed to the upper surfaces of the pair of left and right bent portions 41c by a method such as welding (where in the specification of FIG. 13, the attachment holes 41w are not substantially used). Thereafter, rubber bodies of the vibration-isolating rubber members 42b are inserted in the circular holes 21w in the pair of left and right lower attachment portions 21c of the bracket 20. The bolt shanks of the vibration-isolating rubber members 42b are bolted to the attachment holes 43w formed in the bent portions 43c of the spacers 43. In addition, rubber bodies of the vibration-isolating rubber members 42a are inserted in the pair of left and right circular holes 21v in the front attachment portions 21a of the bracket 20. The bolt shanks are of the vibration-isolating rubber members 42a are bolted to the upper pair of attachment holes 41v in the two sets (four) of attachment holes 41v formed in the front surface portions 41a of the support member 41. In the manner described above, as illustrated in FIG. 13, a specification in which the steering column 11 is at a relatively high position can be obtained.

In the manner described above, with the configuration of this embodiment, a plurality of specifications in which the attachment height of the bracket 20 differs in two levels can be obtained with a simple configuration. In any specification, the bracket 20 is fixed to the support member 41 at a position near the upper end (position of the circular holes 21v) and a position near the lower end (position of the circular holes 21w) of the bracket 20. Accordingly, the steering column 11 can be supported stably. Furthermore, since the attachment holes 41v for use in attaching the bracket 20 at a high position are disposed near the upper end of the support member 41, while the amount of upward projection of the support member 41 is reduced, the attachment height of the bracket 20 to the support member 41 can be changed in a large area.

Figure 14:
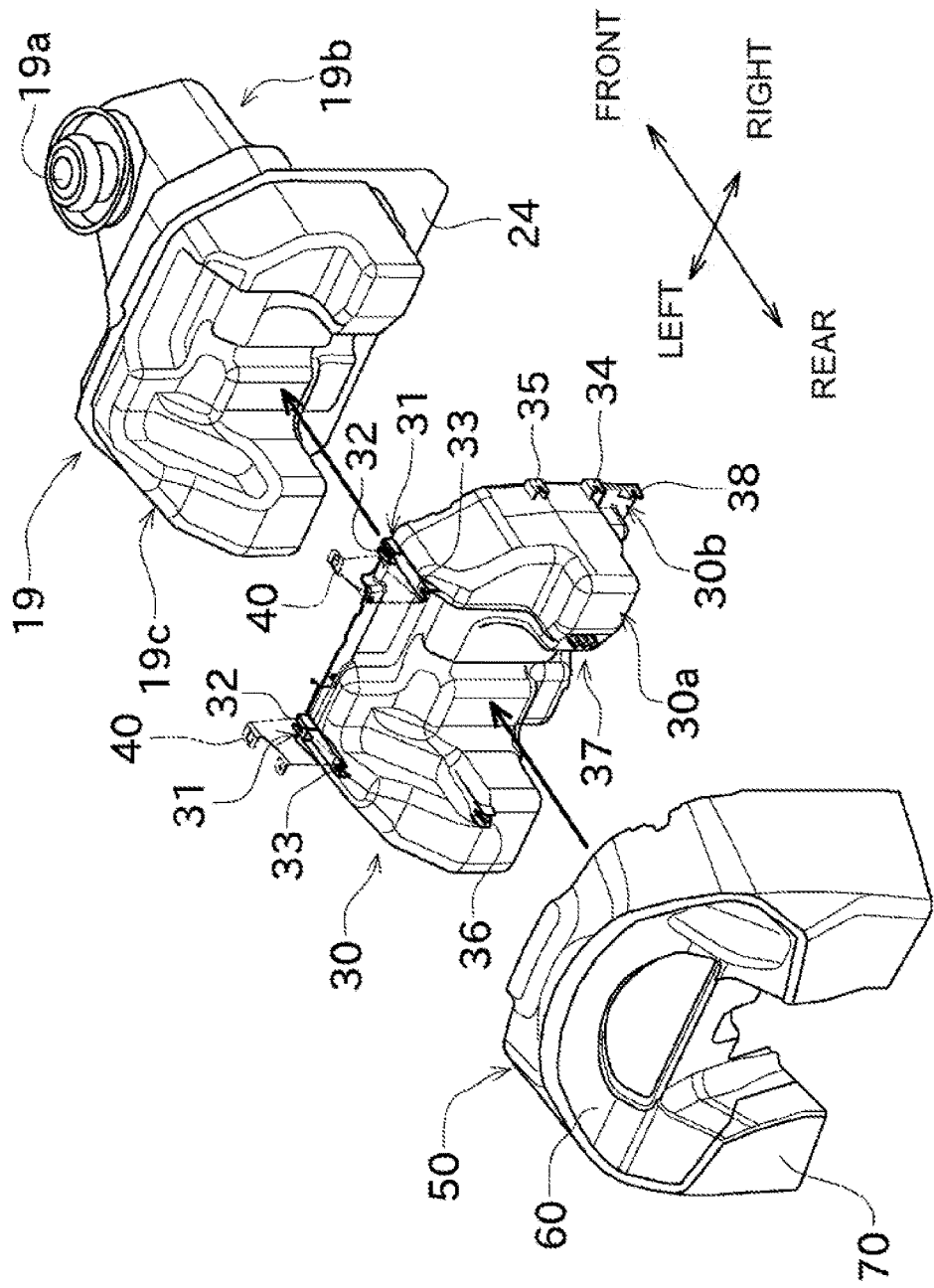
FIG. 14 A disassembled perspective view illustrating an attachment structure for the dashboard.
Figure 15:
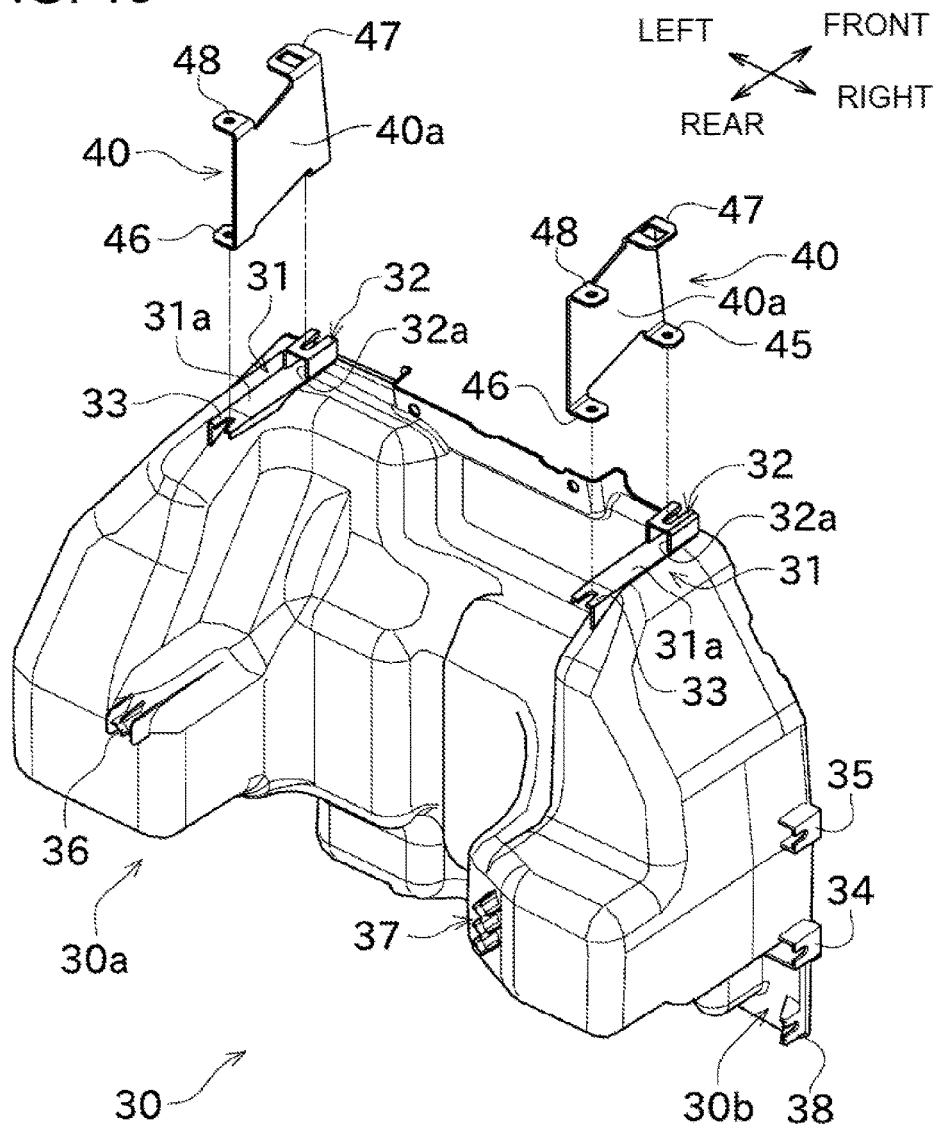
FIG. 15 A perspective view illustrating a state in which the support members are attached to the fuel tank cover.
Figure 16:
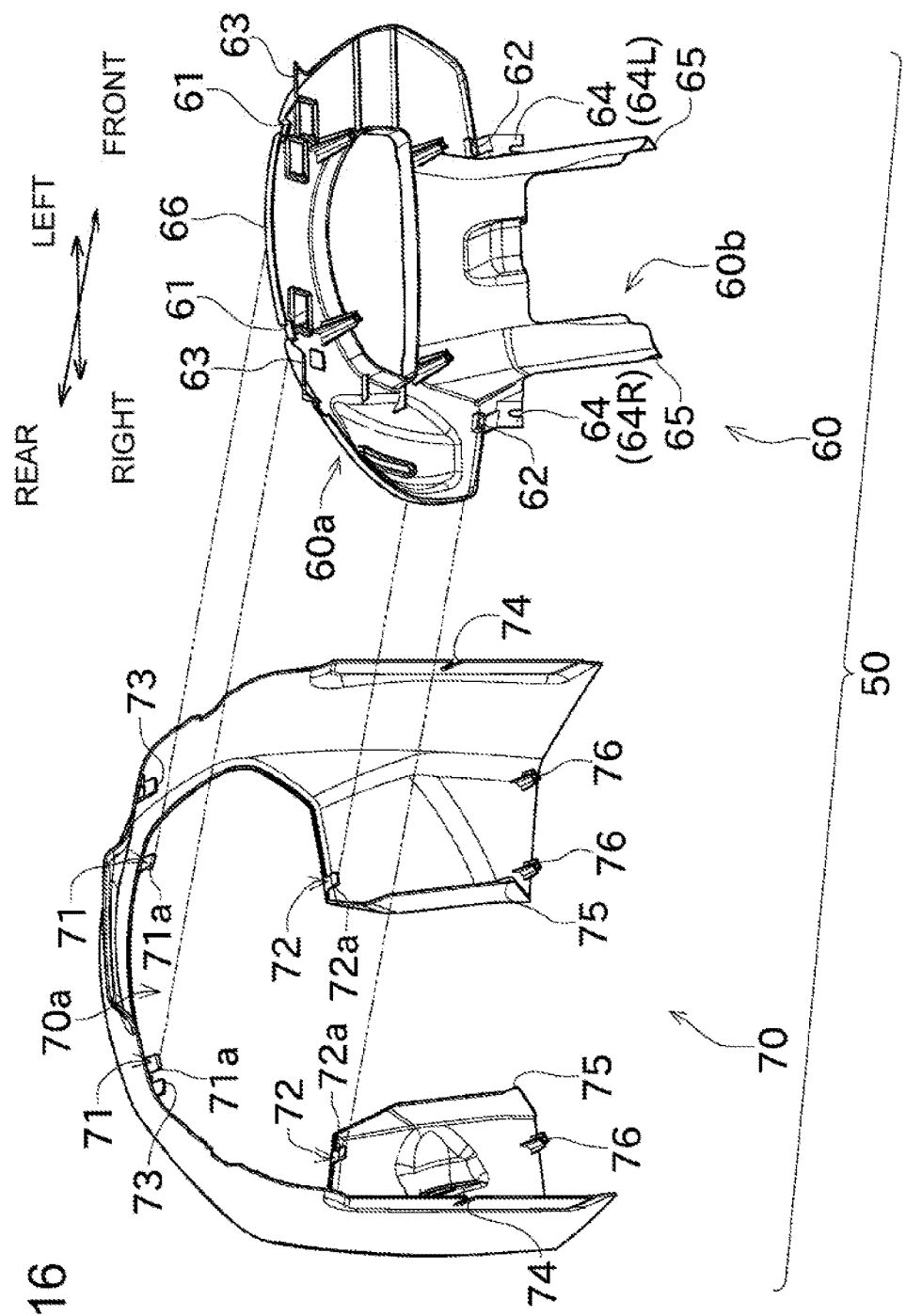
FIG. 16 A perspective view illustrating a configuration of the dashboard.

Subsequently, an attachment structure in which the dashboard 50 can be attached to different positions in the vertical direction included in the tractor 100 of this embodiment will be described with reference to FIGS. 14 through 16. FIG. 14 is a disassembled perspective view illustrating an attachment structure of the dashboard 50. FIG. 15 is a view illustrating a state in which the dashboard support members 40 are attached to the fuel tank cover 30. FIG. 16 is a perspective view illustrating a configuration of the dashboard 50.

As illustrated in FIG. 14, in the tractor 100 according to this embodiment, the dashboard 50 is attached to the fuel tank cover 30 covering the rear portion 19c of the fuel tank 19 with the dashboard support members 40 interposed therebetween. The dashboard 50 can be directly attached to the fuel tank cover 30 without using the dashboard support members 40 (which will be described later). To ease understanding of this configuration, the dashboard support members 40 are indicated by chain lines in FIG. 14.

The fuel tank 19 is formed into a hollow shape and made of a synthetic resin. As illustrated in FIG. 14, the fuel tank 19 is constituted by the front portion 19b having the filler opening 19a and the rear portion 19c covered with the fuel tank cover 30. A cover frame 24 to which the fuel tank cover 30 can be attached is disposed between the front portion 19b and the rear portion 19c. The cover frame 24 may be molded integrally with the fuel tank 19, or may be attached as another member to the fuel tank 19.

The fuel tank cover 30 is constituted by a cover portion 30a covering the rear portion 19c of the fuel tank 19 and a frame portion 30b extending from an edge of the cover portion 30a. The fuel tank cover 30 is disposed immediately behind the fuel tank 19, and is attached to the cover frame 24 with bolts, for example, with the frame portion 30b interposed therebetween.

The cover portion 30a of the fuel tank cover 30 is formed into a shape along the rear portion 19c of the fuel tank 19. The cover portion 30a is open toward the front. To attach the dashboard 50 to the cover portion 30a, as illustrated in FIG. 14, the cover portion 30a includes first attachment portions (attachment portion) 31, second attachment portions 34, third attachment portions 35, a fourth attachment portion (operation panel portion attachment portion) 36, and a fifth attachment portion (operation panel portion attachment portion) 37.

One first attachment portion 31 is disposed at each lateral side of an upper portion of the cover portion 30a. As illustrated in FIGS. 14 and 15, each first attachment portion 31 includes a slender flat portion 31a extending substantially horizontally along the longitudinal direction of the cover portion 30a. Front portion attachment portions 32 are disposed at one side (front ends) of the flat portions 31a in the longitudinal direction, and rear portion attachment portions 33 are disposed at the other side (rear ends) of the flat portions 31a.

The front portion attachment portions 32 are formed at the front ends (ends close to the front portion 19b of the fuel tank 19) of the first attachment portions 31, and project upward from the flat portions 31a of the first attachment portions 31. As illustrated in FIG. 15, each of the front portion attachment portions 32 is formed into an arch shape when viewed in the longitudinal direction.

An insertion space 32a is formed inside the arch shape. Although described in detail later, in the case of attaching the dashboard 50 without using the dashboard support members 40, an insertion projection 73 (see FIG. 16) of the dashboard 50 can be inserted in the insertion space 32a. As illustrated in FIG. 15, each of the front portion attachment portions 32 has an elongated through hole that is used for attaching a bolt or the like, is slender in the longitudinal direction, and is open at the front end.

The rear portion attachment portions 33 are disposed at the rear ends of the first attachment portions 31. A lateral center of each rear portion attachment portion 33 has an elongated through hole that is used for attaching a bolt or the like, is slender in the longitudinal direction, and is open at the rear end. The rear portion attachment portions 33 are disposed at a position relatively lower than the front portion attachment portions 32.

The dashboard support members 40 serving as spacers are attached to the first attachment portions 31. The dashboard support members 40 are configured to enable the dashboard 50 to be attached to upper portions of the dashboard support members 40. In this manner, the dashboard 50 can be disposed at a relatively higher position than that in a case where the dashboard 50 is directly attached to the first attachment portions 31. The dashboard support members 40 will be described in detail later.

The second attachment portions 34 are disposed at lateral side surfaces of the fuel tank cover 30 and project from the front ends of the lower ends of the cover portion 30a outward in the lateral direction from the fuel tank cover 30. Each of the second attachment portions 34 has an elongated through hole that is used for attaching a bolt or the like, is slender in the longitudinal direction, and is open at the rear end.

The third attachment portions 35 are disposed at laterally outer surfaces of the fuel tank cover 30, are disposed slightly above the second attachment portions 34, and project outward in the lateral direction from the fuel tank cover 30. Each of the third attachment portions 35 has an elongated through hole that is used for attaching a bolt or the like, is slender in the longitudinal direction, and is open at the rear end.

In this manner, as illustrated in FIG. 15, one pair of the second attachment portion 34 and the third attachment portion 35 is disposed with a predetermined interval in the vertical direction on each lateral side surface of the fuel tank cover 30. The vertical distance between the centers of the elongated holes formed in the second attachment portion 34 and the third attachment portion 35 is set to coincide with the amount of vertical change in the attachment position of the dashboard 50 depending on whether the dashboard support members 40 described above are present or not.

The fourth attachment portion 36 is formed on the rear surface of a left portion of the fuel tank cover 30 to project rearward from the fuel tank cover 30. The fourth attachment portion 36 has an insertion hole to which a bolt or the like can be attached.

The fifth attachment portion 37 is formed on the rear surface of a right portion of the fuel tank cover 30 to project rearward from the fuel tank cover 30. As illustrated in FIG. 15, the fifth attachment portion 37 has three insertion holes to which bolts or the like can be attached and which are arranged in the vertical direction.

The dashboard support members 40 illustrated in FIG. 15 are made of flat plate-shaped metal member. Each of the dashboard support members 40 includes a rectangular body 40a those thickness direction is oriented in the lateral direction. The dashboard support member 40 includes first and second lower attachment portions 45 and 46 disposed at the lower edge of the body 40a and first and second upper attachment portions 47 and 48 disposed at the upper edge of the body 40a.

Each of the first and second lower attachment portions 45 and 46 is formed by bending a small attachment portion extending downward at each longitudinal end of the lower edge of the body 40a so that the small attachment portion is perpendicular to the body 40a.

The first and second lower attachment portions 45 and 46 are oriented substantially horizontally (i.e., parallel to the flat portions 31a of the first attachment portions 31 of the fuel tank cover 30). The second lower attachment portions 46 are disposed at a position lightly lower than the first lower attachment portions 45. Each of the first and second lower attachment portions 45 and 46 has a through hole in which a bolt or the like can be inserted.

The longitudinal distance between the first lower attachment portion 45 and the second lower attachment portion 46 is set to coincide with the longitudinal distance between the front portion attachment portion 32 and the rear portion attachment portion 33 in each first attachment portion 31. The vertical distance between the first lower attachment portion 45 and the second lower attachment portion 46 is set to coincide with the vertical distance between the front portion attachment portion 32 (upper surface of the front portion attachment portion 32) and the rear portion attachment portion 33 in each first attachment portion 31. Since the positional relationship between the attachment portions correspond to each other as described above, the dashboard support members 40 can be securely attached at two points of the first attachment portion 31.

In a state where the first lower attachment portions 45 are placed on the front portion attachment portions 32 and the second lower attachment portions 46 are placed on the upper surfaces of the rear portion attachment portions 33, the elongated holes of the front portion attachment portions 32 of the first attachment portions 31 are bolted to the through holes of the first lower attachment portions 45, and the elongated holes of the rear portion attachment portions 33 are bolted to the through holes of the second lower attachment portions 46. In this manner, the dashboard support members 40 can be easily attached to the fuel tank cover 30.

Each of the first and second upper attachment portions 47 and 48 is formed by bending a small attachment portion extending upward at each longitudinal end of the upper edge of the body 40a so that the small attachment portion is perpendicular to the body 40a.

The first and second upper attachment portions 47 and 48 are oriented substantially horizontally (i.e., parallel to the first and second lower attachment portions 45 and 46). The first upper attachment portions 47 have rectangular holes that penetrate the first upper attachment portions 47 in the vertical direction. Although specifically described later, the insertion projections 73 (see FIG. 16) of the dashboard 50 can be inserted in these rectangular holes. As illustrated in FIG. 15, the second upper attachment portions 48 have through holes in which bolts or the like can be inserted.

The dashboard 50 is attached to the dashboard support members 40 to cover the rear of the fuel tank cover 30 with the first and second upper attachment portions 47 and 48 interposed therebetween (which will be specifically described later).

As illustrated in FIG. 16, the dashboard 50 is equipped with various measuring instruments such as a speedometer and a fuel indicator, and includes: an operation panel portion 60 constituting the operation panel 10 of the tractor 100; and an outer peripheral board portion 70 that is fixed by engaging with the outer periphery of the operation panel portion 60.

As illustrated in FIG. 16, the operation panel portion 60 includes a main panel portion 60a and an extension portion 60b extending downward from a center portion of the main panel portion 60a. The main panel portion 60a includes a panel surface facing rearward and upward. A pair of recesses 65 that can house projections 75 formed on the outer peripheral board portion 70 are formed in lateral outer sides of a lower end of the extension portion 60b.

An outer peripheral portion of the main panel portion 60a includes an outer edge portion 66 that bends forward (toward the fuel tank cover 30 when being attached to the fuel tank cover 30).

The outer edge portion 66 of the main panel portion 60a includes two upper stopper portions 61 and two lower stopper portions 62. The upper stopper portions 61 and the lower stopper portions 62 are configured to be engageable with the outer peripheral board portion 70. The two upper stopper portions 61 and the two lower stopper portions 62 are formed to be symmetric in the lateral direction in the main panel portion 60a.

The upper stopper portions 61 are formed as recesses formed in parts of the outer edge portion 66 in an upper portion of the main panel portion 60a. The lower stopper portions 62 are formed as rectangular holes formed in lateral sides of the extension portion 60b in the outer edge portion 66 of a lower portion of the main panel portion 60a.

To fix the operation panel portion 60 to the fuel tank cover 30, the operation panel portion 60 includes two first fixing portions (fixing portion) 63 and two second fixing portions 64.

The first fixing portions 63 are disposed laterally outside the two upper stopper portions 61 in the outer edge portion 66 of the upper portion of the main panel portion 60a. The first fixing portions 63 are formed into a substantially horizontal flat plate shape extending forward from the main panel portion 60a. Each of the first fixing portions 63 has an elongated through hole that is used for attaching a bolt or the like, is slender in the longitudinal direction, and is open at the front end.

The two first fixing portions 63 are disposed on the main panel portion 60a to respectively correspond to the rear portion attachment portions 33 of the first attachment portions 31 on the lateral sides of the fuel tank cover 30. Accordingly, the first fixing portions 63 and the rear portion attachment portions 33 of the first attachment portions 31 can be fixed to each other.

The second fixing portions 64 are disposed below the lower stopper portions 62 and are formed in plate shapes extending downward. Each of the second fixing portions 64 has an elongated through hole that is used for attaching a bolt or the like, is slender in the vertical direction, and is open at the lower end.

In the following description, the second fixing portion 64 at the left of the main panel portion 60a will be sometimes referred to as a left fixing portion 64L, and the second fixing portion 64 at the right of the main panel portion 60a will be sometimes referred to as a right fixing portion 64R.

The outer peripheral board portion 70 is formed into a shape covering the outer periphery of the fuel tank cover 30. A center portion of the outer peripheral board portion 70 has an opening 70a in which the operation panel portion 60 can be fitted and attached.

On the edge of the opening 70a in the outer peripheral board portion 70, two upper attachment portions 71 that can be fixed by hooking on the upper stopper portions 61 of the operation panel portion 60 and two lower attachment portions 72 that can be fixed by hooking on the lower stopper portions 62 of the operation panel portion 60 are integrally provided.

Each of the upper attachment portions 71 and the lower attachment portions 72 is formed as a small member extending from the edge of the opening 70a obliquely forward and downward. Stopper nails 71a and 72a for preventing detachment from the upper stopper portions 61 and the lower stopper portions 62 are formed on front ends of the upper attachment portions 71 and the lower attachment portions 72, respectively.

In the foregoing configuration, the upper attachment portions 71 are inserted in the upper stopper portions 61 of the operation panel portion 60 and hooked by the stopper nails 71a, and the lower attachment portions 72 are inserted in the lower stopper portions 62 of the operation panel portion 60 and hooked by the stopper nails 72a. In this manner, the outer peripheral board portion 70 can be fixed to the operation panel portion 60.

To attach the outer peripheral board portion 70 to the fuel tank cover 30, the outer peripheral board portion 70 includes insertion projections (fixing portion) 73 and attachment openings 74.

As illustrated in FIG. 16, on the inner peripheral surface of an upper portion of the outer peripheral board portion 70, one insertion projection 73 is disposed at a corresponding one of laterally symmetric positions with a top of the outer peripheral board portion 70 sandwiched therebetween. Each of the insertion projections 73 is formed into a small plate shape extending obliquely forward and downward from the inner peripheral surface of the outer peripheral board portion 70.

The two insertion projections 73 are disposed at positions corresponding to the front portion attachment portions 32 of the first attachment portions 31 on lateral sides of the upper portion of the fuel tank cover 30.

The attachment openings 74 are formed as elongated through holes that are used for attaching bolts or the like and disposed at lateral ends of the front edge of the outer peripheral board portion 70. Each of the attachment openings 74 extends obliquely rearward and upward from the front edge of the outer peripheral board portion 70.

In a case where the outer peripheral board portion 70 is attached to the fuel tank cover 30 with the dashboard support members 40 interposed therebetween as in this embodiment, the attachment openings 74 are disposed at positions corresponding to the third attachment portions 35 of the fuel tank cover 30. On the other hand, the second attachment portions 34 are disposed below the third attachment portions 35, and as described above, the distance between the third attachment portions 35 and the second attachment portions 34 is set to coincide with the amount of vertical change of the attachment position of the dashboard 50 depending on whether the dashboard support members 40 described above are present or not. Accordingly, in the case of attaching the dashboard 50 with interposition of the dashboard support members 40, the attachment openings 74 can be fixed to the third attachment portions 35, whereas in the case of attaching the dashboard 50 with no dashboard support members 40, the attachment openings 74 can be fixed to the second attachment portions 34.

With the configuration described above, the dashboard 50 can be attached to the fuel tank 19 and the fuel tank cover 30 at different positions in the vertical direction depending on whether the dashboard support members 40 are interposed or not. That is, most part of the configuration of the tractor 100 according to this embodiment can be used for easily configuring a tractor conforming to another specification in which the dashboard 50 is disposed at a low position.

Figure 17:
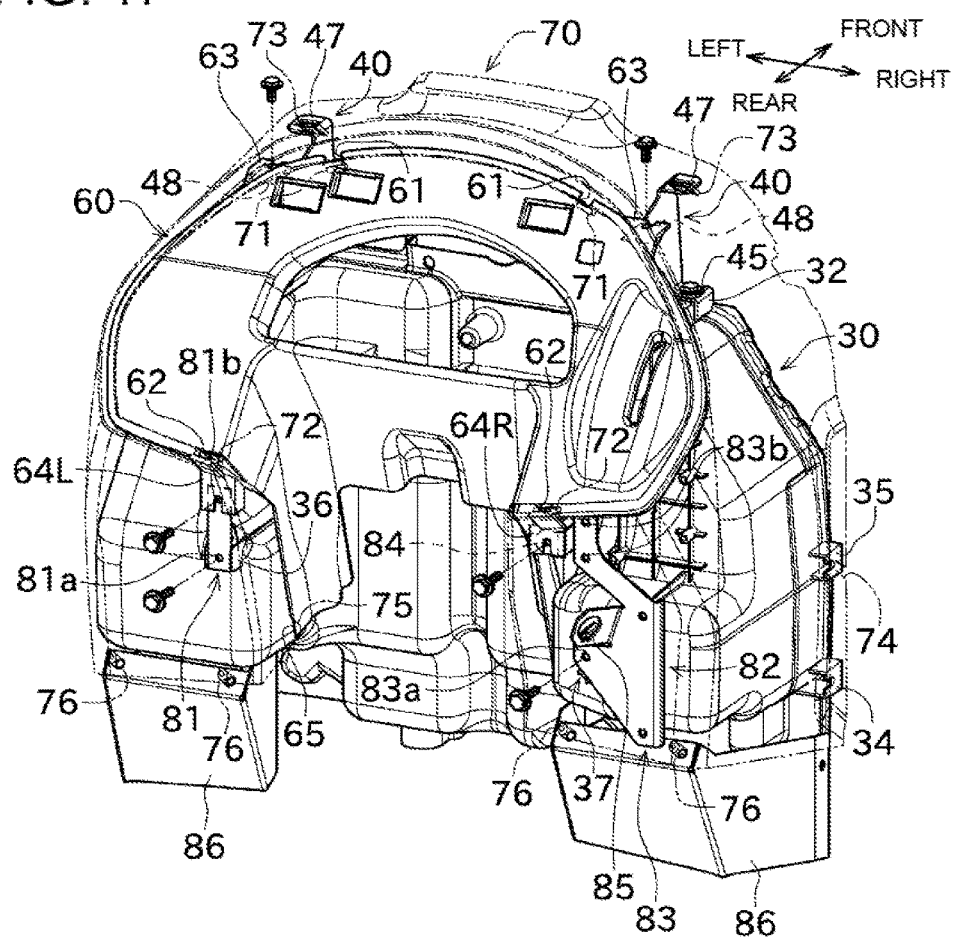
FIG. 17 A perspective view illustrating a state in which the dashboard is attached to the fuel tank cover with the support members interposed therebetween.

A configuration in the case of attaching the dashboard 50 at a relatively high position will now be described with reference to FIG. 17. FIG. 17 is a perspective view illustrating a state in which the dashboard 50 is attached to the fuel tank cover 30 with the dashboard support members 40 interposed therebetween. To ease understanding of the configuration inside the dashboard 50, the outer peripheral board portion 70 is illustrated in a transparent manner by chain lines in FIG. 17.

In the tractor conforming to the specification illustrated in FIG. 17, the dashboard support members 40 are attached to the fuel tank cover 30 so that the dashboard 50 can be disposed at a relatively high position.

To achieve the tractor conforming to this specification, first, as described above, the through holes formed in the first lower attachment portions 45 of the dashboard support members 40 illustrated in FIG. 15 are bolted to the elongated holes of the front portion attachment portions 32, and the through holes formed in the second lower attachment portions 46 are bolted to the elongated holes of the rear portion attachment portions 33 so that the pair of dashboard support members 40 is thereby attached to the fuel tank cover 30.

Next, a left attachment member (attachment member) 81 and a right attachment member (attachment member) 82 for attaching the operation panel portion 60 of the dashboard 50 are attached to the fourth attachment portion 36 and the fifth attachment portion 37, respectively, of the fuel tank cover 30.

The left attachment member 81 is constituted by a slender plate member as illustrated in FIG. 17, and is attached to the fuel tank cover 30 to have its longitudinal direction oriented in the vertical direction. A lower portion of the left attachment member 81 has a lower attachment hole (attachment hole) 81a and an upper portion of the left attachment member 81 has an upper attachment hole (attachment hole) 81b. The lower attachment hole 81a and the upper attachment hole 81b are configured to receive bolts therein. The distance between the centers of the lower attachment hole 81a and the upper attachment hole 81b is set at ½ of the amount of vertical change of the attachment position of the dashboard 50 depending on whether the dashboard support members 40 described above are present or not.

The right attachment member 82 is constituted by a starter switch support member 83 supporting a starter switch 124 (see FIGS. 4 and 6) that is a switch for starting the engine 5 and a bent member 84 formed by bending a slender plate member.

The starter switch support member 83 is formed of a plate member, and stands in an upright position having its thickness direction oriented in the longitudinal direction. The starter switch support member 83 has a support hole 85 that penetrates the starter switch support member 83 and is used for supporting the starter switch. To attach the starter switch support member 83 to the fuel tank cover 30, the starter switch support member 83 has a lower attachment hole (attachment hole) 83a and an upper attachment hole (attachment hole) 83b that are arranged in the vertical direction.

The bent member 84 is formed by bending a slender plate member in an L shape, is disposed to have its thickness direction at one side oriented in the lateral direction, and its thickness direction at the other side oriented in the longitudinal direction. A part of the bent member 84 whose thickness direction is oriented in the lateral direction is attached to a left side surface of the starter switch support member 83 near the upper attachment hole 83b by an appropriate method (e.g., welding).

On the other hand, a part of the bent member 84 whose thickness direction is oriented in the longitudinal direction is disposed to project forward from the starter switch support member 83. The projecting part has a through hole in which a bolt or the like can be inserted.

In the case of attaching the dashboard 50 to the fuel tank cover 30 at a height indicated by FIG. 17, the lower attachment hole 81a of the left attachment member 81 is bolted and fixed to the fourth attachment portion 36 of the fuel tank cover 30. The lower attachment hole 83a of the right attachment member 82 is bolted and fixed to a middle one of the three insertion holes arranged in the vertical direction in the fifth attachment portion 37 as illustrated in FIG. 15. In the forgoing manner, the left attachment member 81 and the right attachment member 82 are attached to the fuel tank cover 30.

Thereafter, the operation panel portion 60 is attached. Specifically, as illustrated in FIG. 17, the elongated holes of the first fixing portions 63 disposed at the left and right of the operation panel portion 60 are respectively bolted to the through holes of the second upper attachment portions 48 of the pair of left and right dashboard support members 40. The elongated hole formed in the left fixing portion 64L of the operation panel portion 60 is bolted to the upper attachment hole 81b of the left attachment member 81, and the elongated hole formed in the right fixing portion 64R of the operation panel portion 60 is bolted to the through hole formed in the bent member 84 of the right attachment member 82.

Subsequently, the outer peripheral board portion 70 is attached. Specifically, the insertion projections 73 of the outer peripheral board portion 70 are inserted in rectangular holes formed in the first upper attachment portions 47 of the dashboard support members 40. The upper attachment portions 71 and the lower attachment portions 72 are respectively inserted in the upper stopper portions 61 and the lower stopper portions 62 of the operation panel portion 60 and fixed by hoking.

Thereafter, the attachment openings 74 formed in the outer peripheral board portion 70 are bolted to the third attachment portions 35 of the fuel tank cover 30. In the case of attaching the dashboard 50 at the height illustrated in FIG. 17, the positions of the attachment openings 74 coincide with the third attachment portions 35 of the fuel tank cover 30, and thus, the attachment openings 74 can be bolted to the third attachment portions 35 without any problem.

In the tractor conforming to the specification illustrated in FIG. 17 in which the dashboard 50 is attached at a relatively high position (tractor 100 according to this embodiment), cover members 86 are disposed at the left and the right to cover lower portions not covered with the dashboard 50. Each of the cover members 86 is disposed to be connected to the lower end of the dashboard 50 and the lower end of the fuel tank cover 30.

To fix the cover members 86, cover attachment portions 76 are disposed on the lower end of the outer peripheral board portion 70 as illustrated in FIG. 16, and cover attachment portions 38 are disposed on the left and right lower ends of the frame portion 30b of the fuel tank cover 30 as illustrated in FIG. 15. The cover members 86 are fixed by, for example, screwing to these cover attachment portions 76 and 38. With this configuration, exposed lower portions of the dashboard 50 and the fuel tank cover 30 can be appropriately covered.

Figure 18:
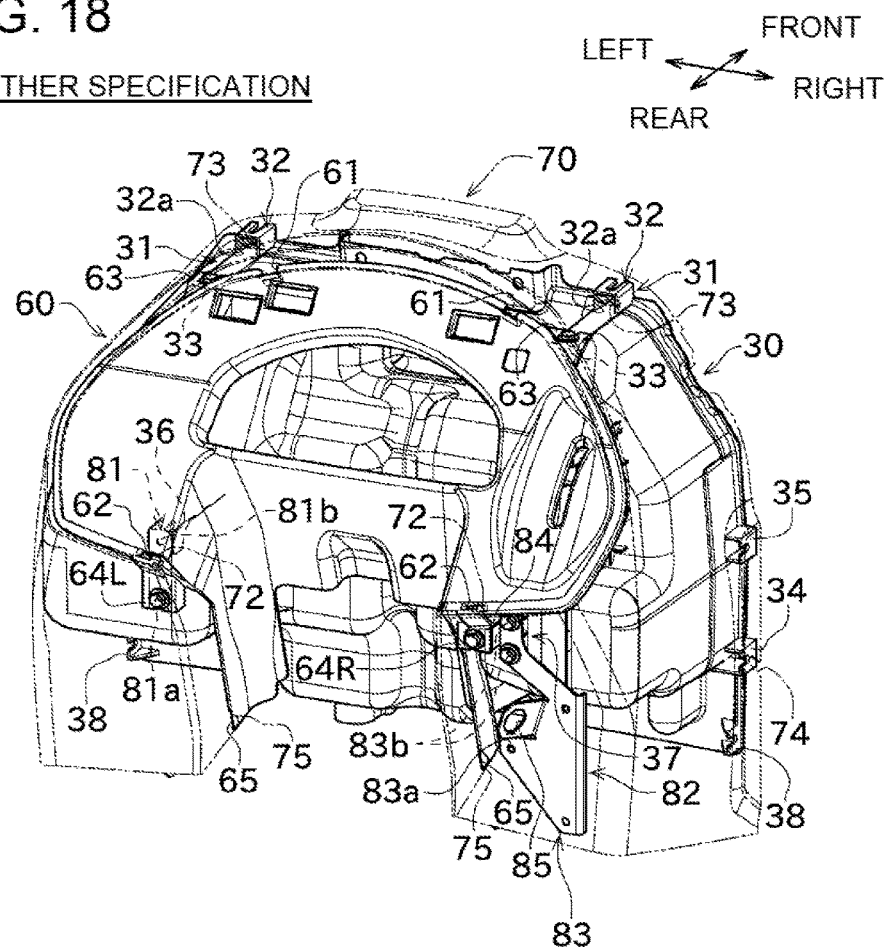
FIG. 18 A perspective view illustrating the tractor conforming to another specification in which the dashboard is directly attached to the fuel tank cover.

Subsequently, a configuration in the case of attaching the dashboard 50 at a relatively low position will be described with reference to FIG. 18. FIG. 18 is a perspective view illustrating a tractor conforming to another specification in which the dashboard 50 is directly attached to the fuel tank cover 30. Similarly to FIG. 17, to ease understanding of the configuration inside the dashboard 50, the outer peripheral board portion 70 is illustrated in a transparent manner by chain lines in FIG. 18.

In the tractor conforming to the specification illustrated in FIG. 18, the dashboard 50 is directly attached to the fuel tank cover 30 so that the dashboard 50 is located at a relatively low position as compared to a case where the dashboard support members 40 are interposed.

To achieve the tractor conforming to this specification, first, the left attachment member 81 and the right attachment member 82 are respectively attached to the fourth attachment portion 36 and the fifth attachment portion 37 of the fuel tank cover 30. It should be noted that the positions at which the left attachment member 81 and the right attachment member 82 are attached to the fuel tank cover 30 are different from those in the case illustrated in FIG. 17. Specifically, the upper attachment hole 81b (not the lower attachment hole 81a) of the left attachment member 81 is bolted and fixed to the fourth attachment portion 36 of the fuel tank cover 30. The two upper attachment holes 83b (not the lower attachment hole 83a) of the right attachment member 82 are bolted and fixed to the insertion holes except the middle insertion hole of the three insertion holes arranged in the vertical direction in the fifth attachment portion 37 as illustrated in FIG. 15.

In the forgoing manner, the left attachment member 81 and the right attachment member 82 are attached to the fuel tank cover 30. Since the left attachment member 81 is attached to the fourth attachment portion 36 to extend in the direction opposite to that in the case illustrated in FIG. 17, even with a compact configuration in which the distance between the lower attachment hole 81a and the upper attachment hole 81b is small, the dashboard 50 can be attached to the fuel tank cover 30 in both of the cases illustrated in FIGS. 17 and 18.

Thereafter, as illustrated in FIG. 18, the elongated holes of the first fixing portions 63 disposed at the left and right of the operation panel portion 60 are respectively bolted to the elongated holes of the rear portion attachment portions 33 of the first attachment portions 31 in the fuel tank cover 30. The elongated hole formed in the left fixing portion 64L of the operation panel portion 60 is bolted to the lower attachment hole 81a of the left attachment member 81. The elongated hole formed in the right fixing portion 64R of the operation panel portion 60 is bolted to the through hole formed in the bent member 84 of the right attachment member 82.

Subsequently, the outer peripheral board portion 70 of the dashboard 50 is attached. Specifically, as illustrated in FIG. 18, the insertion projections 73 of the outer peripheral board portion 70 are inserted in the insertion spaces 32a of the front portion attachment portions 32 of the first attachment portions 31. The upper attachment portions 71 and the lower attachment portions 72 are respectively inserted in the upper stopper portions 61 and the lower stopper portions 62 of the operation panel portion 60 and fixed by hoking the attachment portions 71 and 72.

Then, the attachment openings 74 formed in the outer peripheral board portion 70 are bolted to the second attachment portions 34 of the fuel tank cover 30. In the case of attaching the dashboard 50 at the height illustrated in FIG. 18, since the positions of the attachment openings 74 coincide with the second attachment portions 34 of the fuel tank cover 30, the attachment openings 74 can be bolted and fixed to the second attachment portions 34 without any problem. In the specification illustrated in FIG. 18, the cover members 86 attached in FIG. 17 are omitted.

In the manner described above, a configuration in which the dashboard is attached to two positions in the vertical direction can be obtained only depending on whether the dashboard support members 40 are present or not without changing the configurations of the dashboard 50 and the fuel tank cover 30. Accordingly, the existing dashboard 50 and fuel tank cover 30 can be used for the tractor conforming to another specification illustrated in FIG. 18, and expense in effort and costs, for example, for management of components can be significantly reduced.

As described above, the tractor 100 according to this embodiment includes the fuel tank 19, the fuel tank cover 30, the dashboard support members 40, and the dashboard 50. The fuel tank 19 is disposed in a rear portion of the hood 9 in the longitudinal direction of the vehicle body 2. The fuel tank cover 30 covers the rear portion 19c of the fuel tank 19. The dashboard support members 40 are attached to the fuel tank cover 30. The dashboard 50 is supported by the dashboard support members 40. The fuel tank cover 30 includes the first attachment portion 31 for attaching the dashboard support members 40. The dashboard 50 is also configured to be directly attached to the first attachment portions 31.

In this manner, the configuration in which the dashboard 50 can be disposed at different positions depending on whether the dashboard support members 40 are interposed or not can be obtained. Consequently, the dashboard 50 and the fuel tank cover 30, for example, of the tractor 100 according to this embodiment can also be used for the tractor conforming to another specification in which the dashboard 50 is disposed at a different position (see FIG. 18). Thus, no design changes, for example, are needed for the dashboard 50 and the fuel tank cover 30 so that expense in effort and costs, for example, can be reduced. With the simple configuration of switching attachment of the dashboard support members 40 between present and absent, the dashboard 50 can be attached to different positions.

In the tractor 100 according to this embodiment, the dashboard 50 includes the first fixing portions 63 and the insertion projections 73 formed to be directly attachable to the first attachment portion 31 of the dashboard support members 40 in the fuel tank cover 30. The dashboard support members 40 support the dashboard 50 with interposition of the first fixing portions 63 and the insertion projections 73 of the dashboard 50.

In this manner, the first fixing portions 63 and the insertion projections 73 attached to the dashboard support members 40 can be used as fixing means in the case of directly attaching the dashboard 50 to the fuel tank cover 30 without using the dashboard support members 40. Accordingly, attachment of the dashboard 50 to different positions can be easily performed with a compact configuration.

In the tractor 100 according to this embodiment, the dashboard support members 40 are constituted by plate members, and one dashboard support member 40 is attached to each lateral end of an upper portion of the fuel tank cover 30. The dashboard 50 can be attached to a plurality of positions in the vertical direction depending on whether the dashboard support members 40 are interposed or not.

In this manner, the dashboard support members 40 can be easily formed, and the dashboard 50 can be stably supported at a high position.

The tractor 100 according to this embodiment includes the cover members 86 connected to the lower end of the dashboard 50 and covering space below a gap between the dashboard 50 and the fuel tank cover 30.

In this manner, components, for example, can be suitably covered with the cover member below the dashboard 50 attached at a relatively high position by using the dashboard support members 40. In addition, since the cover members 86 are configured as members different from the dashboard 50, in another specification in which the dashboard 50 is attached at a low position (see FIG. 18), the cover members 86 may be omitted to obtain a compact configuration.

In the tractor 100 according to this embodiment, the dashboard 50 includes the operation panel portion 60 and the outer peripheral board portion 70 fixed to the operation panel portion 60. The fuel tank cover 30 further includes the fourth attachment portion 36 and the fifth attachment portion 37 for attaching the operation panel portion 60. The fourth attachment portion 36 and the fifth attachment portion 37 are provided as members different from the first attachment portions 31. The operation panel portion 60 is attached to the fourth attachment portion 36 and the fifth attachment portion 37 of the fuel tank cover 30 with the left attachment member 81 and the right attachment member 82 interposed therebetween.

In this manner, the operation panel portion 60 can be easily attached to the fuel tank cover 30 at different positions only by appropriately adjusting the left attachment member 81 and the right attachment member 82 without changing the configuration of any of the operation panel portion 60 and the fuel tank cover 30.

In the tractor 100 according to this embodiment, the left attachment member 81 and the right attachment member 82 are constituted by plate members. The left attachment member 81 includes the lower attachment hole 81*a* and the upper attachment hole 81*b* to be attached to the fourth attachment portion 36. The right attachment member 82 includes the lower attachment hole 83*a* and the upper attachment hole 83*b* to be attached to the fifth attachment portion 37.

In this manner, the left attachment member 81 and the right attachment member 82 can be easily configured. In addition, the attachment position of the operation panel portion 60 of the dashboard 50 can be switched with a simple configuration.

In the tractor 100 according to this embodiment, the distance between the lower attachment hole 81*a* and the upper attachment hole 81*b* formed in the left attachment member 81 is ½ of the amount of change of the attachment position of the dashboard 50 depending on whether the dashboard support members 40 are present or not.

In this manner, switching of the height at which the dashboard 50 is attached can be performed with a compact configuration of the left attachment member 81.

In the tractor 100 according to this embodiment, the right attachment member 82 supports the starter switch 124 for starting the engine 5 included in the vehicle body 2 of the tractor 100.

In this manner, the configuration can be simplified.

The foregoing description is directed to the preferred embodiment of the present invention, and the configuration described above may be changed, for example, as follows.

For example, the attachment position (height) of the dashboard 50 may be switched among three or more levels, instead of two levels, by overlaying a plurality of dashboard support members 40 so that the dashboard support members 40 overlap with each other.

The pair of left and right dashboard support members 40 may be coupled by, for example, a horizontal rod-shaped member.

The configuration may be changed in such a manner that upper portions of the dashboard support members 40 have flat surface portions that are slender in the longitudinal direction similarly to the first attachment portions 31 of the fuel tank cover 30, arch-shaped front portion attachment portions are formed on the front ends of the dashboard support members 40, and rear portion attachment portions are formed on the rear ends of the dashboard support members 40.

Instead of the insertion projections 73, the dashboard 50 may include a horizontal flat plate-shaped portion having an elongated hole similar to the first fixing portions 63, for example. The configuration may be configured in such a manner that the dashboard support members 40 (the fuel tank cover 30) have projections and the dashboard 50 has through holes or recesses so that the dashboard support members 40 and the dashboard 50 can be fixed by using the projections and the through holes or the recesses.

In the embodiment described above, the fuel tank 19 includes the cover frame 24 to which the fuel tank cover 30 is attached. The present invention, however, is not limited to this example, and the cover frame 24 may be omitted as long as the fuel tank cover can be disposed to cover the rear portion 19*c* of the fuel tank 19.

In the embodiment described above, the first attachment portions 31, the second attachment portions 34, and the third attachment portions 35 of the fuel tank cover 30 and the first fixing portions 63 and the second fixing portions 64 of the operation panel portion 60, for example, have elongated holes for inserting bolts or the like, and each of these elongated holes is open at an end. The elongated holes may be changed to elongated holes each of which has its both ends closed. The elongated holes may be changed to circular holes. It should be noted that at least one of holes to be bolted together is preferably an elongated hole in order to absorb a dimensional error, for example, of the dashboard 50 or the fuel tank cover 30.

The present invention is not limited to tractors, and is applicable to various work vehicles such as a transplanter, a combine harvester, and a wheel loader.

REFERENCE SIGNS LIST

2 vehicle body
9 hood
19 fuel tank
30 fuel tank cover
31 first attachment portion (attachment portion)
36 fourth attachment portion (operation panel portion attachment portion)
37 fifth attachment portion (operation panel portion attachment portion)
40 dashboard support member (support member)
50 dashboard
60 operation panel portion
63 first fixing portion (fixing portion)
70 outer peripheral board portion
73 insertion projection (fixing portion)
81 left attachment member (attachment member)
81*a* lower attachment hole (attachment hole)
81*b* upper attachment hole (attachment hole)

82 right attachment member (attachment member)
83a lower attachment hole (attachment hole)
83b upper attachment hole (attachment hole)
100 tractor (work vehicle)
124 starter switch (engine starter switch)

The invention claimed is:

1. A work vehicle comprising:
a fuel tank disposed in a rear portion of a hood in a longitudinal direction of a vehicle body of the work vehicle;
a fuel tank cover configured to cover and surround a rear portion of the fuel tank;
a support member attached to the fuel tank cover; and
a dashboard directly attached to the support member,
wherein the fuel tank cover includes an attachment portion for attaching the support member, and
the dashboard is configured to be directly attachable to the attachment portion.

2. The work vehicle according to claim 1, wherein
the dashboard includes a fixing portion configured to be directly attachable to the attachment portion for the support member in the fuel tank cover, and
the support member supports the dashboard with the fixing portion of the dashboard interposed therebetween.

3. The work vehicle according to claim 1, wherein
the support member is constituted by a plate member, one support member being attached to each lateral side of an upper portion of the fuel tank cover, and
the dashboard is configured to be attachable to a plurality of positions in a vertical direction depending on whether the support member is interposed or not.

4. The work vehicle according to claim 3, further comprising
a cover member connected to a lower end of the dashboard and covering a space below a gap between the dashboard and the fuel tank cover.

5. The work vehicle according to claim 1, wherein
the dashboard includes
an operation panel portion, and
an outer peripheral board portion fixed to the operation panel portion, wherein
the fuel tank cover includes an operation panel portion attachment portion for attaching the operation panel portion in addition to the attachment portion, and
the operation panel portion is attached to the operation panel portion attachment portion of the fuel tank cover with an attachment member interposed therebetween.

6. The work vehicle according to claim 5, wherein
the attachment member is formed into a plate shape and has a plurality of attachment holes configured to be attachable to the operation panel portion attachment portion.

7. The work vehicle according to claim 6, wherein
the attachment member includes a member in which a distance between a plurality of attachment holes is ½ of an amount of change of an attachment position of the dashboard depending on whether the support member is present or not.

8. The work vehicle according to claim 5, wherein
the attachment member includes a member configured to support an engine starter switch for starting an engine included in the vehicle body.

9. A work vehicle comprising:
a hood;
a fuel tank disposed in a rear portion of the hood;
a fuel tank cover positioned over a rear portion of the fuel tank;
at least one support member coupled to a top side of the fuel tank cover; and
a dashboard coupled to the at least one support member.

10. The work vehicle of claim 9, wherein:
the support member comprises a bracket.

11. The work vehicle according to claim 10, wherein the dashboard comprises:
an operation panel portion, and
an outer peripheral board portion coupled to the operation panel portion.

12. The work vehicle according to claim 11, wherein:
the operation panel portion includes at least one measuring instrument;
the fuel tank cover is coupled to the fuel tank.

13. The work vehicle according to claim 11, further comprising:
an attachment member configured to couple the fuel tank cover to the operation panel portion of the dashboard; and
wherein a first portion of the attachment member is disposed on the fuel tank cover and a second portion of the attachment member is disposed on the operation panel portion.

14. The work vehicle according to claim 9, further comprising:
an engine;
at least one wheel; and
a steering mechanism coupled to the dashboard and configured to control movement of the at least one wheel.

15. The work vehicle according to claim 9, wherein the support member is coupled to the fuel tank cover and dashboard via one or more bolts.

16. The work vehicle according to claim 9, wherein the fuel tank cover is molded to fit the fuel tank.

17. The work vehicle according to claim 9, wherein the at least one support member comprises:
a first bracket disposed on a left lateral portion of the top side of the fuel tank cover; and
a second bracket disposed on a right lateral portion of the top side of the fuel tank cover.

18. The work vehicle according to claim 9, wherein the dashboard is configured to be coupled to the fuel tank cover such that the dashboard is adjustable between:
a first position in which the at least one support member is disposed between the dashboard and an attachment portion of the fuel tank cover; and
a second position in which the dashboard is directly coupled to the fuel tank cover via the attachment portion of the fuel tank cover.

19. A work vehicle comprising:
a hood;
a fuel tank disposed in a rear portion of the hood;
a fuel tank cover positioned over a rear portion of the fuel tank;
at least one support member coupled to a top side of the fuel tank cover;
a dashboard coupled to the at least one support member;
an operation panel portion; and
an outer peripheral board portion coupled to the operation panel portion.

20. The work vehicle according to claim 19, further comprising:
an attachment member configured to couple the fuel tank cover to the operation panel portion of the dashboard; and
wherein a first end of the attachment member is disposed on the fuel tank cover and a second end of the attachment member is disposed on the operation panel portion.

* * * * *